(12) United States Patent
Arhab

(10) Patent No.: US 6,293,380 B1
(45) Date of Patent: Sep. 25, 2001

(54) HYDROKINETIC COUPLING APPARATUS, IN PARTICULAR FOR MOTOR VEHICLE

(75) Inventor: Rabah Arhab, Saint Brice sous Foret (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/508,005

(22) PCT Filed: Jul. 8, 1999

(86) PCT No.: PCT/FR99/01656

§ 371 Date: Mar. 7, 2000

§ 102(e) Date: Mar. 7, 2000

(87) PCT Pub. No.: WO00/03158

PCT Pub. Date: Jan. 20, 2000

(30) Foreign Application Priority Data

Jul. 8, 1998 (FR) .................................................. 98 08734

(51) Int. Cl.⁷ .................................................. F16H 45/02
(52) U.S. Cl. ................. 192/3.29; 192/70.17; 192/70.18; 192/212
(58) Field of Search ................................. 192/3.28, 3.29, 192/3.3, 70.17, 70.18, 212; 464/66, 68

(56) References Cited

U.S. PATENT DOCUMENTS

| | | | |
|---|---|---|---|
| 2,694,478 | * 11/1954 | Zeidler | 192/70.18 |
| 4,353,444 | * 10/1982 | Bionaz | 192/3.29 |
| 4,926,988 | * 5/1990 | Kundermann | 192/3.29 |
| 5,209,330 | 5/1993 | MacDonald | 192/3.29 |
| 5,613,582 | * 3/1997 | Jackel | 192/3.29 |
| 5,826,690 | * 10/1998 | Maingaud et al. | 192/70.18 |
| 6,065,577 | * 5/2000 | Arhab et al. | 192/70.18 |
| 6,079,530 | * 6/2000 | Arhab | 192/3.29 |
| 6,123,177 | * 9/2000 | Arhab | 192/3.29 |
| 6,176,362 | * 1/2001 | Arhab | 192/213.1 |

FOREIGN PATENT DOCUMENTS

| | | |
|---|---|---|
| A-2.634.849 | 2/1990 | (FR) . |
| A-2.726.620 | 5/1996 | (FR) . |
| A-2.749.634 | 12/1997 | (FR) . |
| A-2765296 | 12/1998 | (FR) . |
| WO-A-94/07058 | 3/1994 | (WO) . |

* cited by examiner

Primary Examiner—Richard M. Lorence
(74) Attorney, Agent, or Firm—Liniak, Berenato, Longacre & White

(57) ABSTRACT

A hydrokinetic coupling apparatus (10), in particular for a motor vehicle, comprising a housing (12) provided with a wall (24), with globally transverse orientation, a turbine wheel (30), and a locking engagement (16), including a piston (50) linked in rotation with the housing (12) and a set (56) of parallel friction discs (120, 124, 122), which comprises two front (120) and rear (122) discs linked in rotation with the turbine wheel (30) and an intermediate disc (124) which is linked in rotation with the two elements constituted by the piston (50) and the transverse wall (24) of the housing (12). The piston (50) and the transverse wall (24) of the housing (12) are linked in rotation by straps (104) substantially elongated tangential to a circumference of the assembly and whereof the opposite ends are attached to these two elements, and the intermediate friction disc (124) is driven in rotation by means (114, 138) attaching the ends of the straps (104).

25 Claims, 29 Drawing Sheets

HYDROKINETIC COUPLING APPARATUS, IN PARTICULAR FOR MOTOR VEHICLE

BACKGROUND OF THE INVENTION

1. Field of the Invention

The present invention concerns a hydrokinetic coupling apparatus, notably for a motor vehicle, of the type described and depicted for example in the document WO-A-93/13339.

2. Description of Related Art

This document describes and depicts a hydrokinetic coupling apparatus, notably for a motor vehicle, of the type having:

- a casing provided with a wall, of transverse orientation overall, able to be connected with respect to rotation to a driving shaft;
- a turbine wheel fixed with respect to rotation to a hub able to be connected with respect to rotation to a driven shaft;
- a lock-up clutch, acting between the turbine wheel and the transverse wall, which has, arranged axially from front to rear between the turbine wheel and the transverse wall:
- a damper plate, fixed with respect to rotation to a turbine wheel, in the form of an annulus with a roughly transverse orientation and which has at its external periphery an annular portion, of roughly axial orientation, which circumferentially guides and holds circumferentially acting elastic members, and which has areas, of roughly transverse orientation, of abutment for the circumferential ends of the elastic members;
- a piston in the form of an annulus, of transverse orientation overall, movable axially and connected with respect to rotation to the casing;
- and at least one flat annular friction disc, of roughly transverse orientation, which carries, on its front and rear opposite faces, two annular friction linings which are able to clamped axially by the piston between respectively itself and the opposite internal face of the transverse wall of the casing, the friction disc having at its external periphery drive lugs which extend axially towards the rear inside the peripheral annular portion of the damper plate in order each to be received between the circumferential ends of two consecutive circumferentially acting elastic members, and which is able to move axially with respect to the damper plate.

In the document FR-A-2.634.849, the lock-up clutch has a set of flat annular parallel friction discs, of roughly transverse orientation, which is able to be clamped axially by the piston between effectively itself and the opposite internal face of the transverse wall of the casing and which includes on the one hand two radially external front and rear discs which are here connected with respect to rotation directly to the turbine wheel and on the other hand a radially internal intermediate disc which is disposed axially between the front and rear discs and which is connected with respect to rotation to the piston, annular friction linings being interposed between the opposite annular faces of the friction discs, the piston and the internal face of the transverse wall. As a result the solution is noisy.

SUMMARY OF THE INVENTION

The object of the present invention is to mitigate this drawback.

The invention proposes a hydrokinetic coupling apparatus of the type mentioned above which is the subject of the document FR-A-2.634.849, characterised in that the piston and the wall of the casing are connected with respect to rotation by tongues substantially elongated tangentially to a circumference of the apparatus and whose opposite ends are coupled to these two elements, and in that the intermediate friction disc is driven in rotation by means for coupling the ends of the tongues, to one of the two elements.

By virtue of the tongues, the piston is formed and moves easily axially. The solution is not noisy. The friction discs can be made to slip more easily in order, for example, to filter the vibrations at a given vehicle engine speed.

Preferably it is the means of coupling the ends of the tongues to the transverse wall which drive the intermediate disc.

As a result the piston undergoes less stress than in the prior art and can move rapidly in a quiet manner.

The drive washer described in the document FR-A-2 726 620 is for example used.

This washer forms part of the coupling means.

According to other characteristics of the invention:

- the tongues are coupled by their first ends to a first one of the two elements which they connect with respect to rotation, by means of a drive washer common to all the tongues and which is coupled to this first element, and the intermediate friction disc is driven in rotation by the common drive washer;
- the drive washer can be distinct from the tongues or be in a single piece with them;
- the external radial periphery of the common drive washer has a ferrule of roughly axial orientation having at least one notch through which there extends, radially inwards, a drive lug belonging to the intermediate friction disc;
- the ferrule of the common drive washer has a series of notches distributed angularly in a regular manner, through each of which there extends, radially inwards, a corresponding drive lug in a series of lugs belonging to the intermediate friction disc;
- each notch is open axially in the axial end edge of the ferrule of the common drive washer;
- each drive lug is received with circumferential clearance in a corresponding notch in the ferrule of the common drive washer;
- each drive lug of the intermediate friction disc lies in the plane of the disc;
- the ferrule of the common drive washer is an axially oriented cylindrical ferrule;
- the ferrule of the common drive washer is a frustoconical ferrule;
- the common drive washer is coupled to the first element by gluing or welding or riveting;
- the common drive washer is coupled to the transverse wall of the casing;
- the front and rear friction discs each have at least one drive lug which extends radially outwards in order to be received in a notch in an axially oriented cylindrical annular skirt connected with respect to rotation to the turbine wheel;
- the front and rear friction discs each have a series of drive lugs distributed angularly in a regular manner in order to be received in corresponding notches in an axially oriented cylindrical annular skirt connected with respect to rotation to the turbine wheel;
- each notch is axially open;

each drive lug extends in the plane of its friction disc;

one of the front or rear friction discs has at least one drive lug which extends radially outwards in order to be received in a notch in an axially oriented cylindrical annular skirt connected with respect to rotation to the turbine wheel, and the other one of the rear and front friction discs has at least one drive lug which cooperates with a driving lug of said at least one disc;

the drive lug of said other disc extends radially outwards and then axially in the direction of the other disc;

the drive lug of said other disc is angled at 90°, and the drive lug of said disc extends in the plane of this disc;

the drive lugs of the front and rear friction discs are angled twice so that their free end portions, radially external and of transverse orientation, are substantially coplanar;

one of the front or rear friction discs has at least one drive lug angled at 90° which extends radially outwards and then axially in the direction of the other disc opposite a drive lug which extends radially outwards from the periphery of the other one of the rear or front friction discs and whose free end extends radially in a notch formed in an annular cylindrical skirt, of roughly axial orientation, connected with respect to rotation to the turbine wheel.

As a variant, supplementary axially elastic tongues connect the intermediate disc to the drive washer with respect to rotation.

As a variant it is the tongues which are extended for driving the intermediate disc. These extensions affect the ends of the tongues.

the lock-up clutch has a torsion damper interposed between the turbine wheel and the piston, and the said skirt belongs to an input part of the torsion damper.

The front and rear friction discs can be connected with respect to rotation, with axial mobility, to a piece attached to an input part coupled rigidly or elastically to the turbine wheel and therefore fixed to the turbine wheel.

For example, a ring can be attached to a first guide washer for a torsion damper having a damper plate fixed to the turbine wheel and coupled elastically to the first guide washer.

The ring has an axially oriented annular skirt with teeth for meshing with teeth on at least one of the friction discs, and advantageously with both.

As a variant, the ring is attached directly to the damper plate fixed to the turbine wheel.

Preferably, two guide washers are provided on each side of the damper plate for symmetrical passage of the torque. The ring, in general terms the attached piece, can have the required thickness for transmitting the torque. It can have the required axial and/or radial size for driving the two friction discs. By virtue of this arrangement, the thickness of the guide washer or of the damper plate to which the attached piece is fixed can be reduced.

The front and rear friction discs can come into engagement with each other, to connect them with respect to rotation, radially above drive lugs or, in general terms, a drive connection provided on a piece coupled rigidly or elastically to the turbine wheel.

Thus it is possible to reduce the cantilevers and therefore the axial length of the drive lugs, which makes it possible not to excessively weaken the piece from which the said lugs came.

BRIEF DESCRIPTION OF THE DRAWINGS

Other characteristics and advantages of the invention will emerge from a reading of the following detailed description, for an understanding of which reference should be made to the accompanying drawings, in which.

DETAILED DESCRIPTION OF THE PREFERRED EMBODIMENTS

In the following description, identical, similar or analogous components will be designated by the same reference numbers.

To facilitate the reading of the description and claims, the terms front, rear, upper, lower, vertical, horizontal etc will be used non-limitatively and with reference to the figures.

Figure 1:
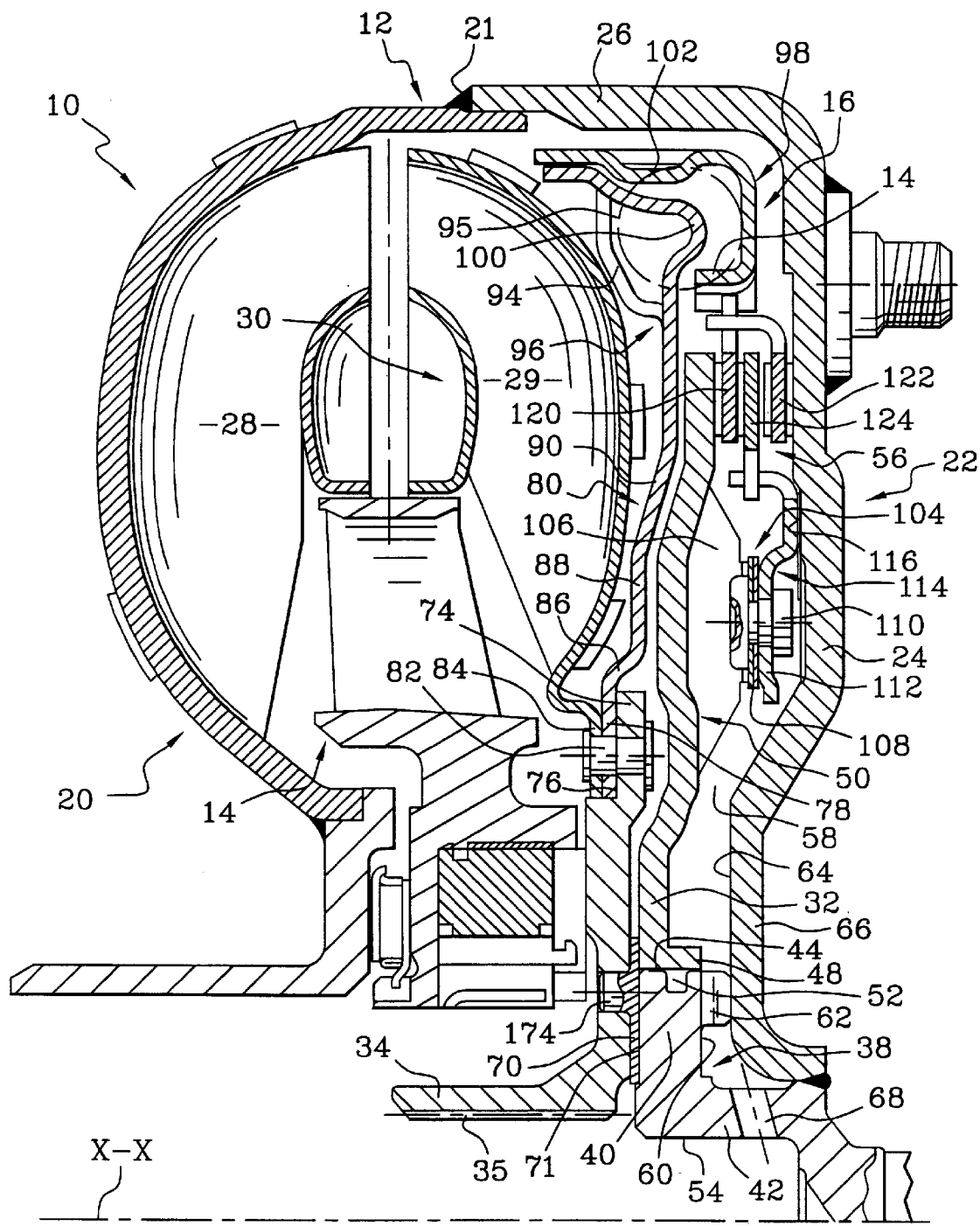
FIG. 1 is a half-view in axial section of a first embodiment of a coupling apparatus according to the teachings of the invention.
Figure 2:
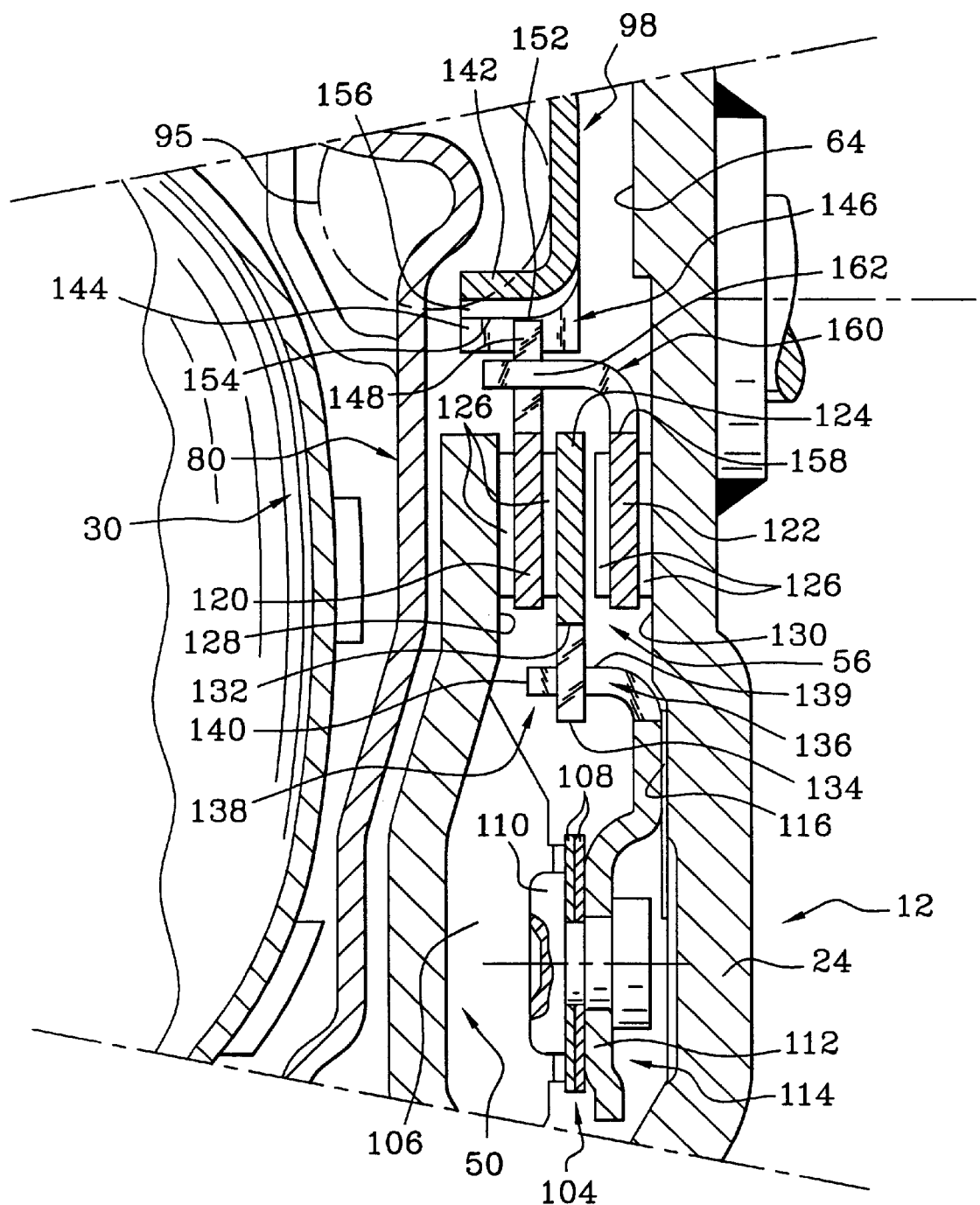
FIG. 2 is a view to a larger scale of a detail of FIG. 1 which illustrates more particularly the set of friction discs.

According to a design which is known, for example, from the document WO-A-94/07058, to which reference can be made for more information, a hydrokinetic coupling apparatus 10 able to rotate about an axial symmetry axis X—X, such as the one illustrated in FIGS. 1 and 2, has, arranged in one and the same sealed housing filled with oil and forming a casing 10, a torque converter 14 and a locking clutch 16, usually referred to as a lock-up clutch.

The casing 12, here metallic, constitutes a driving element and is able to be connected with respect to rotation to a driving shaft (not shown), namely for example the crankshaft of the internal combustion engine in the case of an application to a motor vehicle, as illustrated in certain figures.

The casing 12, annular in shape overall, consists of two half-shells, front 20 and rear 22, facing each other and sealingly fixed at their external periphery, usually by a welding operation 21.

The rear shell 22 is able to be connected with respect to rotation to the driving shaft and consists essentially of an annular wall 24 which is of transverse orientation overall, that is to say which extends in a radial plane perpendicular to the axis X—X of the apparatus, and which is extended at its external periphery by an annular cylindrical wall 26 of roughly axial orientation.

The front half-shell 20 is shaped so as to define an impeller wheel with vanes 28 in the internal face of this half-shell 20.

These vanes 28 face the vanes 29 of a turbine wheel 30 fixed here by riveting, or by welding as a variant, to a plate 32 of the hub produced here in a single piece with a hub 34 fluted internally at 35 for rotational connection to a driven shaft (not shown), namely the input shaft of the gearbox in the case of an application to a motor vehicle.

The driven shaft is hollowed out internally to form a channel allowing a control fluid, here oil, to gain access to a blind rear central bore 54 in a guide and thrust ring 38 located axially between the hub 34 and the transverse wall 24 and here forms a centering device.

The driven shaft communicates through channels 68 with a chamber 58 as described below.

The guide ring 38 is a machined solid piece which consists essentially of a front and radially external portion 40 and a rear and radially internal portion 42.

The function of the rear portion 42, as will be explained below in more detail, is essentially to provide the positioning and centering and/or fixing of the guide ring 38 with respect to the transverse wall 24, whilst the front portion 40, with a larger diameter, is delimited radially towards the outside by a machined cylindrical area 44 for the axial sliding guidance of a piston 50 which has at the centre for this purpose an axially oriented ferrule 48.

The cylindrical guide area 44 has an internal radial groove 52 which receives an annular sealing joint which provides the sealed sliding of the piston 50 on the guide ring 38.

The front portion 40 of the guide ring 38 includes the aforementioned rear central bore 54 in which a free end portion of the driven shaft, which passes through the hub 34, is able to be rotatably received.

According to a design known, for example, from the document FRA-2.634.849, the piston 50 delimits—with the guide ring 38, the transverse wall 24 and a set 56 of friction discs—a variable-volume chamber 58 fed by the driven shaft through the guide ring 38.

From its rear face 60, of transverse orientation, the large-diameter front portion of the guide ring 38 has a series of axially oriented studs 62, which are distributed angularly in a regular manner and which determine, with the internal face 64 of the central part 66 of the transverse wall 24, as many radially oriented passages which put the internal chamber 58 in communication with one or more channels 68, which pass through the smaller-diameter rear cylindrical part 42 of the ring 38, in order to make the chamber 58 communicate with the inside of the ring 38 which is closed axially towards the rear and which opens out axially towards the front inside the hub 34, 35.

The hub 34 is coaxial with the other elements of the apparatus, and notably the ring 38, and is extended radially towards the outside, as from the rear end portion of its socket-shaped body, through the transversely oriented plate 32.

A piece 70 is attached to the plate 32 in order to constitute an axial-abutment piece, on the one hand for the front radial face of the front part of the ring 38 and on the other hand for the front end face of the ferrule 48 for slidably guiding the piston 50.

To this end, the piece consists essentially of a plate in the form of a flat ring which is centred in a countersink 71 in the ring 38.

The rear flat annular face of the plate constitutes a support face for the ferrule 48 and for the front transverse face of the ring 38 which, for its centering, has a complementary countersink. The rear transverse face of the plate 32 has holes which receive axial pins 174 on the attached plate 70, which therefore provides a centering of the ring 38 with respect to the hub 34.

The plate 70 also forms a strut between the plate 32 and the piston 50, that is to say, in the disengaged position of the piston 50, there exists an axial clearance between the opposite front annular face of the internal radial part of the piston 50 and the opposite annular face of the plate.

The main central part of the plate 32 is extended radially outwards by an external radial edge 74, with a greater axial thickness, which has an annular countersink 76 formed in the front transverse face of the plate 32.

The transverse bottom of the countersink 76 constitutes a rearward axial support surface for a transversely oriented flat annular internal radial edge 78, belonging to a damper plate 80 forming the output element of the lock-up clutch 16.

This internal radial edge 78 is fixed to the thick edge 74 of the plate 32 by a series of rivets 82, each of which passes through a hole formed in the edge 74 of the plate 32 and a corresponding hole formed in the internal radial edge 78 of the damper plate 80. Each rivet also passes through a hole formed in a lug 84 belonging to the turbine wheel 30.

The lugs 84 belong to a series of lugs on the turbine wheel 30, each of which extends radially towards the inside in a transverse plane and is adjacent to the front annular face of the edge 78 of the damper plate 80 so as to be also received inside the countersink 76.

As a variant, the lugs 84 are connected together to form a ring.

As from its internal radial edge 78, the damper plate 80 has, radially towards the outside, an elbow 86 and then a central portion in the form of a flat annulus 88 so as to substantially follow the facing contour of the turbine wheel 30, and then a portion of roughly frustoconical shape 80, and an external peripheral annular portion 94.

The annular portion 94 is shaped roughly as an axially oriented recess which is open axially towards the rear in the direction of the transverse wall 24.

In section, the peripheral annular portion 94 has a hollow profile, and receives a series of circumferentially acting coil springs 95, which act on one and the same circumference.

According to a principle known through the document WO-A-94/07058, to which reference should be made for more information, the springs 95 are thus guided circumferentially and are retained axially towards the rear by the input part 98 of a torsion damper 96 of the clutch 16.

The output part of the damper 96 consists of the portion 94.

The springs 95 thus act between the output damper plate 80 and the friction discs belonging to the assembly 56. To this end, the input part 98 and the guidance portion 94 of the springs 95 have support areas respectively 102, 100, which are circumferential support surfaces consisting of the dished circumferential ends.

The areas 102 consist of dished parts and the areas 100 of clefts as described in the aforementioned document WO-A-94/07058.

According to an arrangement which is known from the document FR-A-2.726.620 and French patent applications FR 97 07758 and FR-97 08386, the piston 50 is connected with respect to rotation to the transverse wall 24 by a series of elastic tongues 104 arranged substantially along a circumference and which act tangentially between protrusions 106 on the piston 50 to which longitudinal ends (visible in FIGS. 7, 9 and 10) of the tongues 104 are connected by riveting, the tongues 104 being connected at their other ends by rivets 110 to brackets or lugs 112 on a drive washer 114 which is common to all the tongues and which is connected, for example by bonding, riveting or welding, to a facing portion 116 of the internal face 64 of the transverse wall 24 of the casing 12.

The lugs 112 are offset axially towards the piston 59 with respect to the main part of the washer adjacent to the portion 116.

Each of the tongues 104, elastically deformable axially, consists here of an axial stack of two identical tongues made from cropped sheet metal. The tongues 104 are four in number are driven angular in a regular manner about the axis X—X of the hydrokinetic coupling device.

As can be seen in the figures, each tongue 104 is adjacent to the opposite transverse face of the corresponding protrusion 106 which, in the clamped or engaged position of the piston 50, is substantially coplanar with the plane in which there extend the transverse faces of the lugs or brackets 112 against which the ends 108 of the tongues 104 are axially clamped by riveting. These lugs 112 are hollowed out opposite the rivets for fixing the tongues 104 to the piston 50.

Thus, in the clamped position of the clutch 16, the tongues 104 all extend substantially in the same plane as the median transverse plane of the set 56 of friction discs externally delimiting the chamber 58.

A description will now be given in detail of the set 56 of friction discs, and their means of driving in rotation, of the first embodiment referring more particularly to FIG. 2.

The set 56 includes three adjacent friction discs, amongst which can be seen a front disc 120 and a rear disc 112, between which there is axially disposed an intermediate friction disc 124.

Each of the three friction discs, which belong to the set 56, is roughly in the form of a flat annular disc, of roughly transverse orientation, which is a piece of cropped sheet metal, where applicable folded.

In order to constitute a set 56 of friction discs, certain lateral faces of the discs are provided with a friction lining.

In the example illustrated in FIGS. 1 and 2, given by way of non-limitative example, each of the opposite lateral faces of the front 120 and rear 122 friction discs is provided with a friction lining 126 which is for example bonded to the corresponding metal face, the free face of each friction lining being able to be smooth or grooved according to a design known from the document PCT/EP 92/02480 to allow a controlled progressive sliding.

In this example embodiment, the opposite lateral faces of the intermediate friction disc 124 therefore have no friction linings, just like the opposite annular face 128 of the external periphery of the piston 50 and the opposite annular portion 130 of the internal face 64 of the transverse wall 24 of the casing 12.

As a variant the intermediate friction disc 124 and the faces 128, 130 are provided with friction linings 126, whilst the discs 120, 122 have no friction linings. All combinations are possible.

According to one characteristic of the invention, the intermediate disc 124 is connected with respect to rotation to the subassembly consisting of the two elements—piston 50 and transverse wall 24—which are connected with respect to rotation by tangential tongues 104.

To this end, and in accordance with the teachings of the invention, the intermediate friction disc 124 is more particularly connected with respect to rotation to the means of coupling the ends of the tongues 104 to one of the two elements 50 and 24. The coupling means include here the washer 114 driving the tongues 104.

More precisely, the intermediate disc 124 in the form of a flat annulus has at its internal radial periphery 132 a series of drive lugs 124 which are angularly distributed in a regular manner and each of which extends radially inwards in the transverse plane of the body of the intermediate friction disc 124.

Each of the radial drive lugs 134, for the purpose of driving the intermediate friction disc 124 in rotation, is received, with circumferential clearance, in a notch 136 formed in an axially oriented annular cylindrical ferrule 138 which belongs to the common washer 114 for driving the tongues 104 in rotation, described previously.

To this end, the ferrule 138 has a series of cutouts which extend axially from the front axial end edge 140 of the ferrule 138 so as to constitute notches 136 which open out axially in the free end edge 140 of the ferrule 136 and each of which is delimited circumferentially by two consecutive axially oriented lugs 139.

The axial length of the notches 136 is such that the driving lugs 134 for the intermediate friction disc 124 can move axially in the notches 136 and therefore with respect to the piston 50 and transverse wall 24.

The front 120 and rear 122 friction discs, the main annular parts of which, which carry friction linings 126, are situated radially at the same dimension as the annular central part of the intermediate friction disc 124 which is received clamped between the friction linings 126 carried by the discs 120 and 122. The front 120 and rear 122 friction discs are driven in rotation by the damper 96 of the lock-up clutch 16, or more precisely by the input part 98.

To this end, the input part 98 has on the inside an axially oriented skirt 142 which is produced in one piece by pressing and which has an annular cylindrical shape arranged radially towards the inside with respect to the springs 95, and whose parts 156 dished radially towards the inside 144 delimit between them notches 146 which are open axially in both directions and radially towards the inside. Flutes are thus formed, and this in a continuous manner.

The notches 146 are distributed angularly in a regular fashion and each of them is designed to receive, with circumferential clearance, a radial lug 148 for driving the front friction disc 120 in rotation. The drive lugs 148 also serve for centering this front friction disc 120 since their external radial end edge 152 cooperates with the concave cylindrical portion 154 of the dished parts 156 of the skirt 152.

In the first embodiment illustrated in FIGS. 1 and 2, the rotation of the rear friction disc 122, simultaneously with the front friction disc 120 and by the input part 98, is ensured, radially below the skirt 142, indirectly by means of the front friction disc 120. The skirt 142 is directed axially towards the damper plate 80 in the opposite direction to the wall 24.

To this end, the external radial periphery 158 of the rear friction disc 122 has a series of drive lugs 160 which are angularly distributed in a regular manner and each of which is angled at 90° so as to extend first of all radially towards the outside and then axially, from the rear to the front in the direction of the front friction disc 120.

Thus each of the angled drive lugs 160 terminates in an axially oriented free end portion 162 which is received circumferentially between two consecutive lugs 148 for driving the front friction disc 120 in rotation.

A description will now be given of the second embodiment illustrated in FIG. 3, which is merely a variant of the first embodiment described previously.

In fact it is here the rear friction disc 122 which by means of its lugs 160 is driven in rotation directly by the input part 98 of the torsion damper 96 with springs 95 and which indirectly drives in rotation the front friction disc 120, the means of driving in rotation the intermediate disc 124 by the washer 114 common to the tongues 104 being identical to those described previously.

The angled lugs 160 for driving the rear friction disc 122 in rotation cooperate directly, through the axial end portions 162, with notches 146 in the input element 98.

Each notch 146 is here delimited by lugs 164 angularly distributed in a regular manner, and each of which extends radially towards the inside from the skirt 142, these drive lugs 164 being produced by cropping and bending the material making up the skirt 142.

The lugs 148 for driving the front friction disc 120 in rotation here have an external radial length which is shorter, if they are compared with the previous embodiment, and are received circumferentially in notches, each of which is delimited by two consecutive angled lugs 160, that is to say more precisely between two consecutive axial end portions 162.

A description will now be given of the third embodiment illustrated in FIG. 4.

Figure 3:
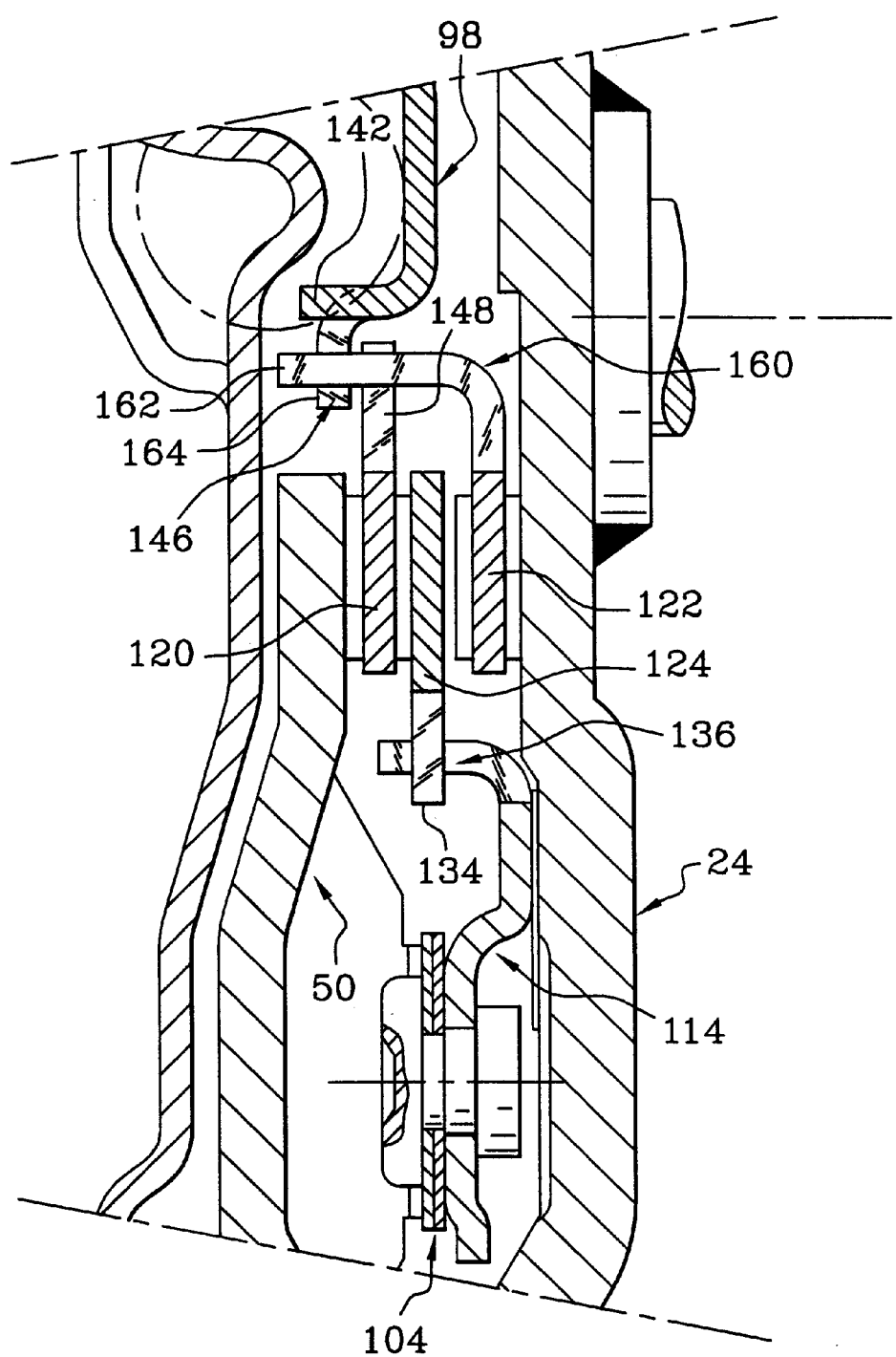
FIGS. 3 to 5 are views similar to those of FIG. 2 which illustrate respectively second, third and fourth embodiments of the invention.

In this embodiment, it is found first of all that the ferrule 138 belonging to the washer 114 common to the tongues 104 here has a roughly frustoconical shape whilst having, as in the case of the cylindrical annular ferrules 138 illustrated in FIGS. 2 and 3, notches 136 for driving in rotation the intermediate friction disc 124 with its drive lugs 134. The contact surfaces between the edges of the notches 136 and the lugs 134 are thus increased in order to reduce wear.

The front 120 and rear 122 friction discs are here identical, with a particularly simple design, and are driven in rotation simultaneously and directly by the skirt 142 of the input element 98 of the elastic damper.

To this end, as in the case of the first two embodiments, the drive lugs 148 of the front friction disc 120 extend radially toward the outside in the transverse plane of the disc 120 and, in the same way, the drive lugs 160 of the rear friction disc 122 also extend radially outwards in the transverse plane of the rear friction disc 122.

The skirt 142 has a series of notches 146 which are angularly distributed in a regular manner and each of which is delimited circumferentially by two consecutive lugs 164 on the skirt 142 which are here axially oriented and which delimit between them notches 146 open axially towards the rear.

Figure 5:
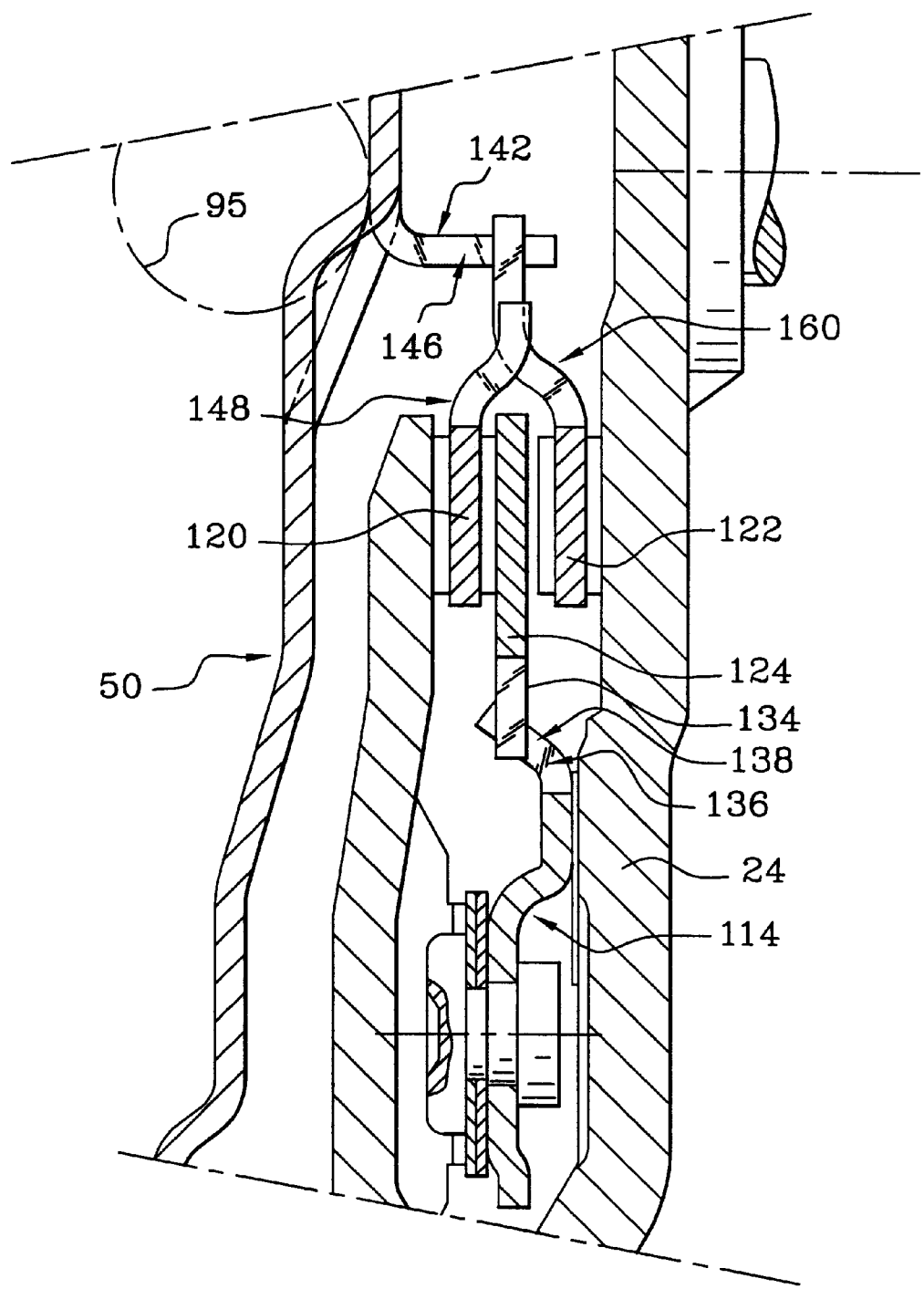

In the fourth embodiment illustrated in FIG. 5, if it is compared with the third and previous embodiment, the rear friction disc 122 is driven directly in rotation by the skirt 142 whilst the front friction disc 120 is driven indirectly in rotation by the rear friction disc 122.

To this end, the drive lugs 160 for the rear friction disc 122 are angled twice at 90°, that is to say in an S, so that their radially external free end portion extends in a median transverse plane substantially coplanar with the plane in which the intermediate friction disc 124 lies.

In the same way, but symmetrically with respect to this median plane, the drive lugs 148 of the front friction disc 120 are angled twice so as to have an S-shaped profile. The radially external free end portions of the drive lugs 148 also lie in the same plane as the drive lugs 160 and are nested and interposed between the drive lugs 160 of the rear friction disc 122.

By way of variant, not shown, it is the drive lugs 126 for the front friction disc 120 which can be the longest, radially towards the outside, in order to directly ensure the driving of the disc 120 in rotation by the ferrule 142, the drive lugs 160 for the rear friction disc 122 then being shorter.

Figure 4:
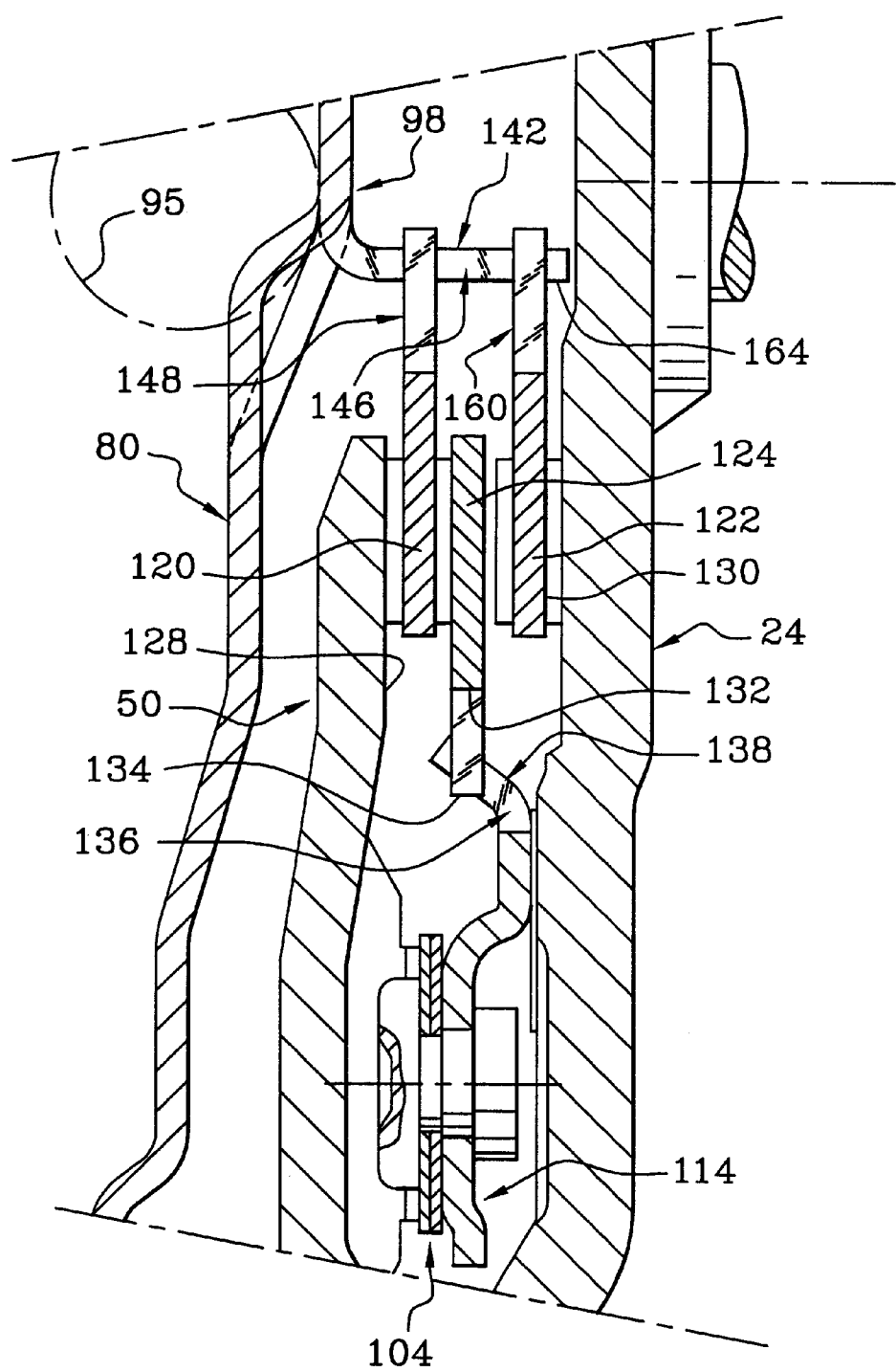

It will be noted that, in FIGS. 4 and 5, the skirt 142 is directed towards the wall 24, that is to say in the opposite direction to the damper plate 80.

Naturally, in a variant, the tongues 104 are extended radially towards the outside, by means of lugs, and the intermediate disc 124 has a ferrule with notches of the same type as the ferrule 138 of the drive washer 114.

The extensions of the tongues 104 then enter the notches in the ferrule of the intermediate disc 124 in order to drive the nut in rotation. The extension is produced at the end fixing the tongues 104 to the washer 114.

As a variant, second tongues located radially above the tongues 104, connect the intermediate friction disc 124 to the drive washer 114 with respect to rotation. These second tongues are carried by the washer 114, or more precisely by the external periphery of the washer 114.

The second tongues are axially elastic to allow an axial movement of the intermediate disc.

They extend for example tangentially.

To do this the drive lugs 134 of the disc 124 and lugs of the washer 114 similar to the lugs 112 and offset radially with respect to these are used.

Figure 7:
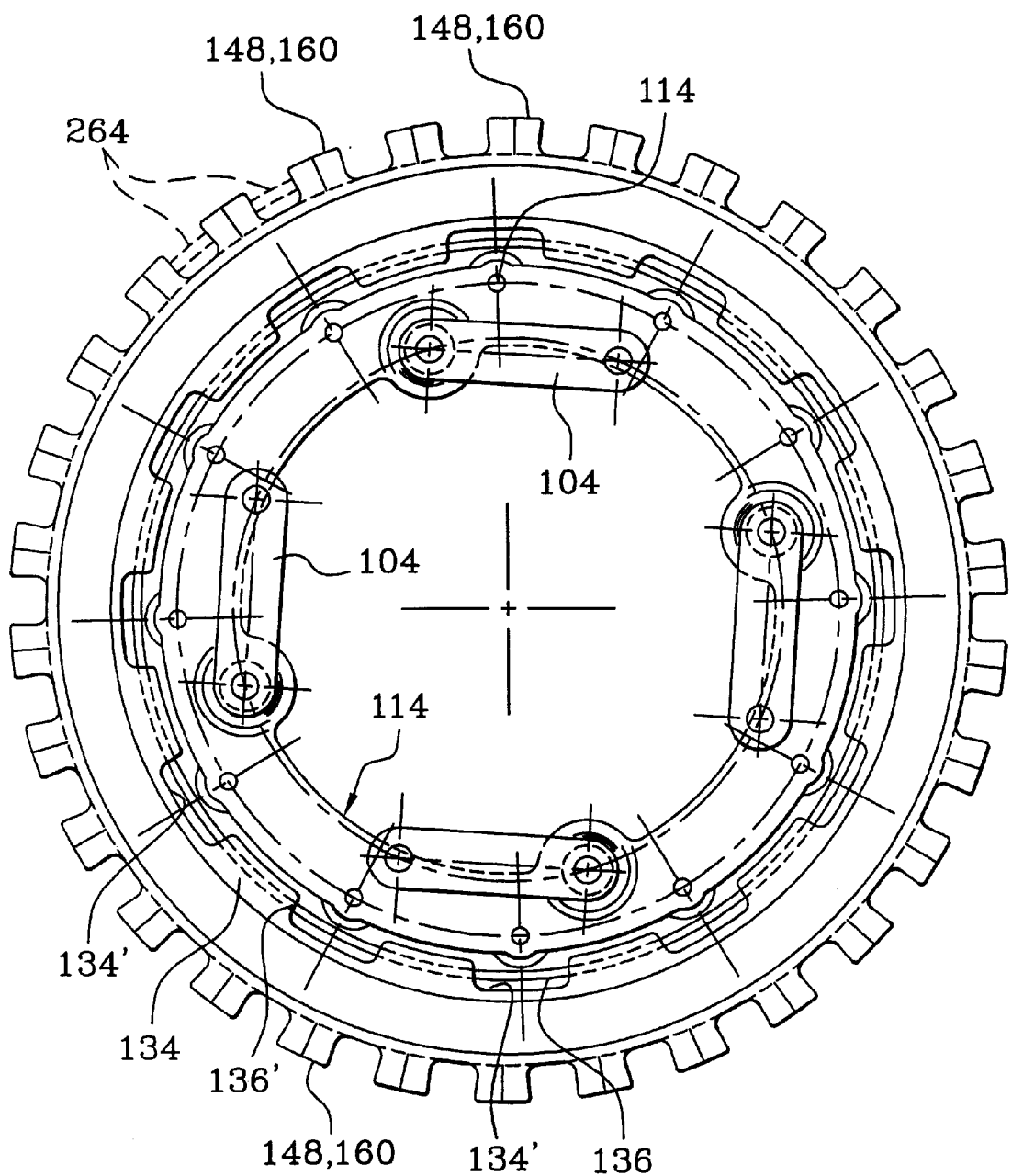
FIG. 7 is a front view in the direction of the arrow in FIG. 6 showing the drive piece and the discs with the different rotation connections allowing an axial movement.

Naturally, as can be seen for example in FIG. 7 of the document FR-A-2 726 620, the tongues 104 are in a single piece with the drive washer and therefore carry, as in FIGS. 1 to 5, the tongues 104.

In this case the wall 24 is dished locally axially in the direction of the damper plate 80 in order to be in the same plane as the lugs 112 in FIG. 1.

This single drive piece can be provided at its external periphery with second tangential tongues fixed directly to the flat-shaped intermediate disc 124, or more precisely to drive lugs for the latter. The single piece therefore carries the second axially elastic tongues.

This single piece is fixed for example by riveting by means of extruded rivets issuing from the wall 24, as described in the aforementioned application FR-A-2 726 620.

As a variant each tongue 104 is attached by individual pieces to the wall 24 and has for example lugs or notches for meshing with notches or lugs provided at the internal periphery of the disc 124.

Naturally the structures can be reversed, for example the single drive piece can be fixed to the piston. The fixing to the transverse wall 24 is achieved by means of rivets. For this the piston has, opposite the rivets fixing the tongues to the transverse wall, passage holes allowing the riveting operation. These holes are then closed off at the end by an obturator, such as a plug mounted in the passage hole. It is possible to operate in the same way to fix the tongues to the piston after having previously fixed the tongues to the wall 24.

The passage holes finally closed off by the obturators being produced in the wall.

The obturators can be fixed by bonding, screwing, welding, crimping, snapping on etc to the wall or piston.

In all cases the coupling means, for example the drive washer, the individual pieces, the single drive piece or even the tongues themselves are used for driving the intermediate friction disc in rotation either by meshing, or by means of supplementary tongues or extensions.

The presence of a damper 96 is not obligatory. The damper plate 80 can be fixed for example directly to the turbine wheel 30, for example by welding. In a variant it is fixed to the hub.

This damper plate, in one embodiment, has a skirt similar to the skirt 124 of the input element 98 in order to drive in rotation at least one of the discs 120, 122 as in FIGS. 1 to 5. The input element is omitted.

Naturally, the torsion damper 96 can have another shape and the discs 120, 122, 124 can be embedded in a friction lining. Thus, for example, in FIG. 4, the discs 120 and 124 can be embedded in a friction lining 126. The friction lining associated with the disc 120 has a first face allowed to rub against the face or surface 128 of the piston 50, and a second face allowed to rub against the intermediate disc 124.

Likewise the friction lining associated with the disc 122 has a first face allowed to rub against the portion or surface 130 of the wall 24 and a second face allowed to rub against the intermediate disc 124.

All combinations are possible. The surfaces 128, 130 can belong to pieces attached to the piston and/or the wall 24. These pieces can be provided with grooves in order to cool the friction linings.

Figure 6:
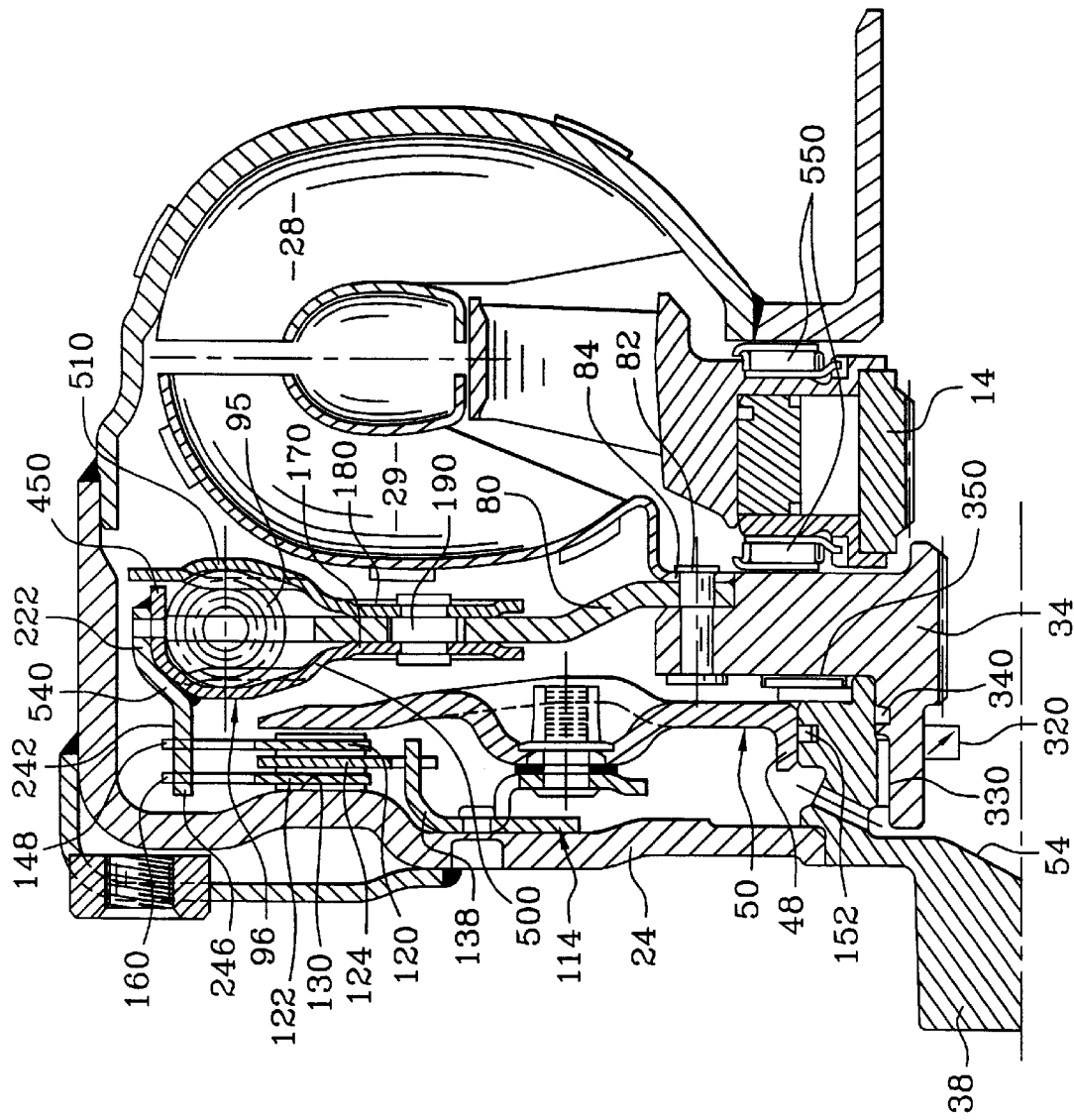
FIGS. 6, 8, 9 and 10 are views similar to FIG. 1 for respectively a fifth, sixth, seventh and eighth embodiment of the invention.

FIG. 6, similar to FIG. 4, illustrates one of these variants in which the front 120 and rear 122 friction discs, flat in shape, each have teeth meshing with teeth belonging to an axially oriented annular skirt-242 belonging to a ring 222. The discs 120, 122 are identical.

This ring 222 is fixed to a flange 450 belonging to a first guide washer 170, coupled, by means of elastic members 95, to the damper plate 80 fixed to the plate 32 of the hub 34 by the rivets 82 also making it possible to fix the internal annulus 84 of the turbine wheel 30.

The hub 34 enters here into the rear central bore 54 of the ring 38. The bore 54 forms a blind hole and the ring 38, a centering device, for centering the apparatus on the driving shaft.

The hub 34 carries internally a lip joint 320 for cooperating with the end of the driven shaft. A ring 330, forming a bearing, and a sealing ring 340 act between the external periphery of the hub 34 and the internal periphery of the ring 38, forming a centering device.

A needle bearing 350 acts between the rear face of the plate 32 of the hub and the front face of the ring 38. The bearing 350 is radially oriented. The ring 222 can be in a single piece with the flange 450 whilst being obtained by rolling and folding in reverse directions as from the flange 450 in order to double the latter in thickness. Likewise needle bearings 550 are provided at the level of the reactor 14. The joint cooperating with the 48 of the piston 50 can be seen at 152.

Here, the ring 222 is fixedly attached to the flange 450 whilst being in intimate contact with at least part of the external periphery of the flange 450 which is annular in shape and axially oriented. The flange 450 surrounds the damper plate 80 and extends at the external periphery of the washer 170.

The first guide washer 170 is fixed to a second guide washer 180 adjacent to the turbine wheel 30. More precisely, the guide washers 170, 180 are disposed on each side of the damper plate 80 and are fixed together at their internal periphery, in the form of a plate, by small columns 190 each passing, with circumferential clearance, through an opening (not referenced) produced in the damper plate. The torsion damper 96 is therefore located for the major part between the turbine wheel 30 and the piston 50.

The ring 222 extends radially above the piston 50. The elastic members 95, here concentric helical springs, are housed in scallops provided at the external periphery of the damper plate 80.

These scallops are delimited by radial lugs on which the circumferential ends of the springs 95 bear. The guide washers 170, 180 are shaped at their external periphery so as to match the shape of the springs 95. For more information, reference should be made to the document FR-B-2 749 634 showing this type of damper and notably to FIG. 5, the connection of the flange 450 to the second guide washer 180, using crimped lugs each passing through a rectangular opening produced in the second guide washer. Each guide washer 170, 180 therefore has a rounded part respectively 500, 510 matching the shape of the springs 95. These parts are interrupted locally by dished parts so that the springs 95 are compressed between the dished parts and the lugs on the damper plate 80 when there is a relative movement between the damper plate 80 and the wall 24.

The ring 222 has a connection area 540 partially matching the rounded shape 500 of the first guide washer. The area 540 connects the ring 222 proper to the skirt 242 in the form of an annular comb because of the presence of an alternation of notches 246, open axially towards the wall 24, and driving lugs 264, distributed in a regular fashion. Two lugs 264 are depicted in dotted lines in FIG. 7.

The lugs 264 and the notches constitute the teeth on the ring. These teeth 264, 246 are offset radially towards the inside with respect to the ring 222 attached here by welding to the flange 450. In FIG. 6, the bead resulting from this welding can be seen in black. Another bead exists between the rounded part and the skirt 242. As a variant, the fixing is effected by riveting, bonding etc.

The ring 222 is thicker than the guide washers 170, 180, which have great strength since the skirt 242 is not formed in the first guide washer 170.

This increase in thickness in the skirt makes it possible to reduce wear and to have the required number of lugs 264 so that heat treatment and other hardening processes can be avoided. In addition the axial length of the skirt 242, which is stronger, is better controlled.

Thus the discs 120, 122, here identical, each have a radially oriented set of teeth made from an alternation of lugs respectively 148, 160 and radially open notches. The lugs 148, 160 enter the notches 246 in the axially oriented set of teeth in the skirt 242 and vice-versa, the lugs 264 entering the notches in the discs 120, 122.

The discs 120, 122, forming drive discs, are therefore connected with respect to rotation, with axial mobility, as in the other figures, with the input part, here formed by the ring 222 with skirt 242, of the torsion damper 96. The area 130 is formed by pressing the part 24. The area 130 extends in axial projection in the direction of the piston 50 with respect to the rest of the wall 24.

The torsion damper 96 can have several stages as described in the document FR-A-2 749 634.

Here the intermediate disc 124, flat in shape, meshes with the common washer 114 driving the tongues as in the embodiment in FIG. 1. The disc 124 therefore has at its internal periphery a radially oriented set of teeth with an alternation of lugs 134 and notches 134' (FIG. 7).

The washer 114 has at its external periphery a ferrule 138 with axially oriented teeth formed by an alternation of lugs 136 and notches 136' (FIG. 7).

The lugs 134 of the disc 124 enter with mounting clearance in the notches 136' in the annular axially oriented ferrule 138 and vice-versa.

The skirt can be produced in the first guide washer 170 as described in the document FR-A-2 749 634. In this case, the skirt (FIG. 8) is produced by means of lugs 364 cut in the rounded piece 50. For example, provision can be made, as in the document FR-A-2 749 634, for three lugs 364 between two dished parts supporting the springs.

With the ring 222 of FIG. 6, the lugs have the required axial length, notably because of the increase in thickness of the ring. With lugs 364 cut in the first guide washer 170, this is not always possible, notably for reasons of strength of the guide washer 170.

Thus, according to one characteristic, the front 120 and rear 122 discs come into engagement with each other radially above the lugs 364 cut out locally, and here regularly annularly in the first guide washer 170. These lugs come into engagement with the front disc 170. Thus the lugs 364 can have a reduced length, connections by cooperation with shapes of the lug and notch type act respectively between the discs 120, 122 and between the lugs 364 and the disc 122.

Figure 8:
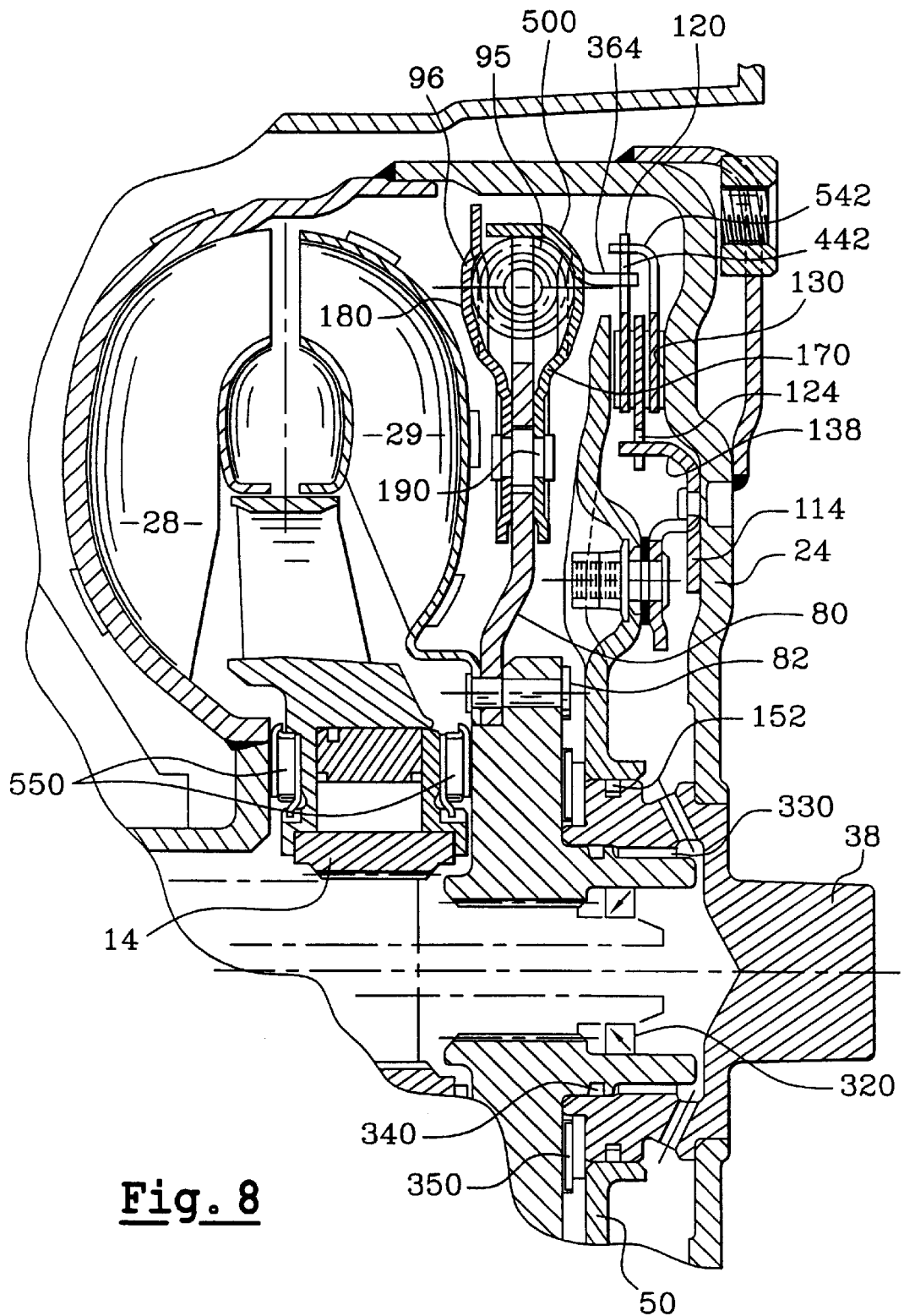

Thus, in FIG. 8, the front disc 120 is flat and has at its external periphery radially oriented teeth 442 consisting of a regular angular alternation of lugs and notches open radially towards the outside. The teeth 442 extend radially above the lugs 364 obtained by cropping and folding from the rounded part 500 of the first guide washer 170. The rear disc 122 has at its external periphery axially oriented teeth 542 directed towards the front disc.

The teeth 542 consist of a regular angular alternation of lugs and notches open axially towards the turbine wheel. The lugs in the set of teeth 442 pass through the notches in the set of teeth 542 and vice-versa.

In FIG. 8, the different sets of teeth 542, 442 can be seen, as well as the teeth acting between the ferrule 138 and the intermediate disc 124, as described in the other figures. The number of lugs and notches depends on the application.

Figure 9:
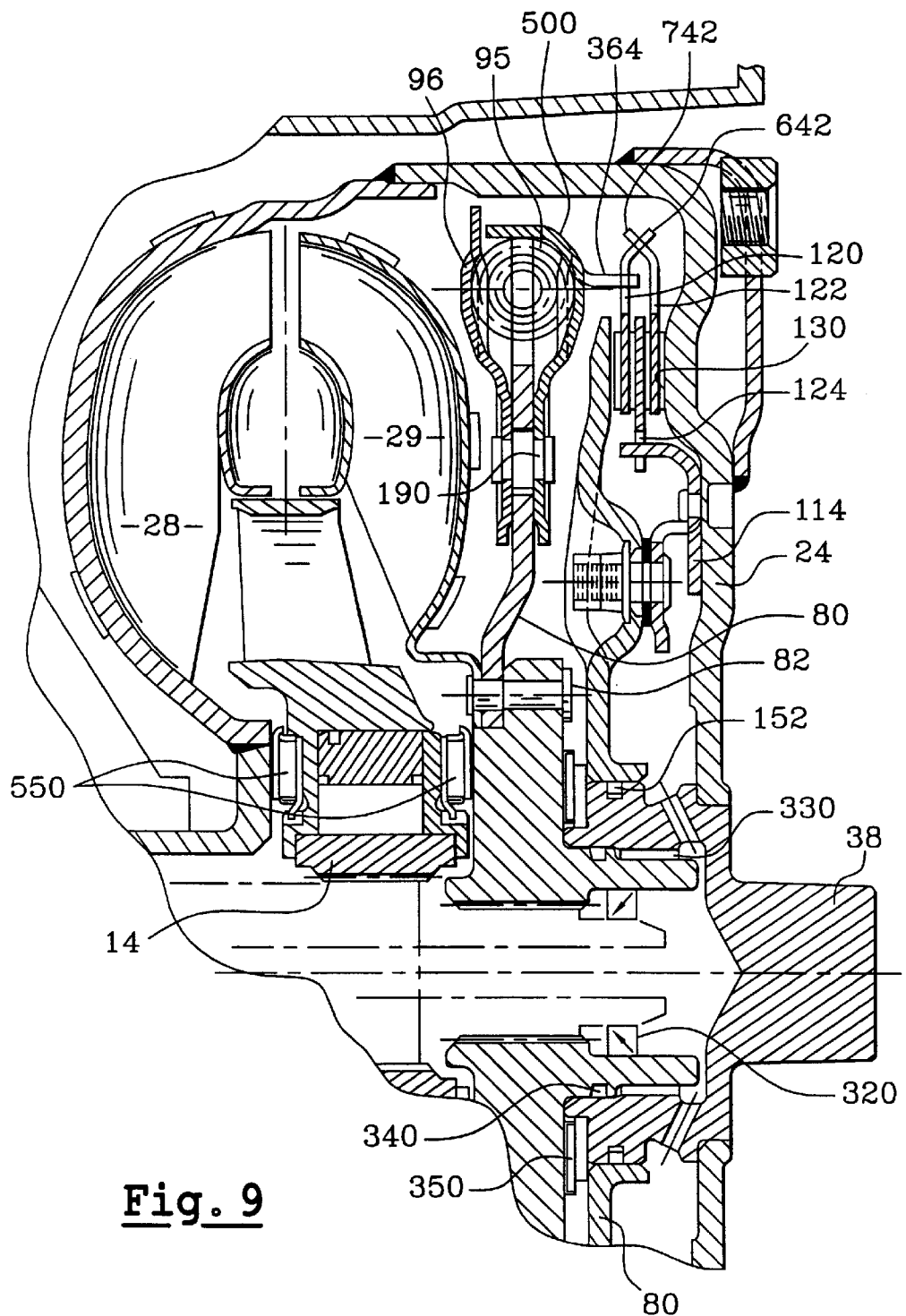

In FIG. 9, the discs 120, 122 each have at their external periphery a set of teeth 642, 742 inclined in the direction of the other with an alternation of drive lugs and notches entering the notches and lugs of the other set of teeth, and this radially above the lugs 365 coming into engagement with the disc 120, as in FIGS. 7 and 8. The lugs 364 also have a reduced length.

Figure 10:
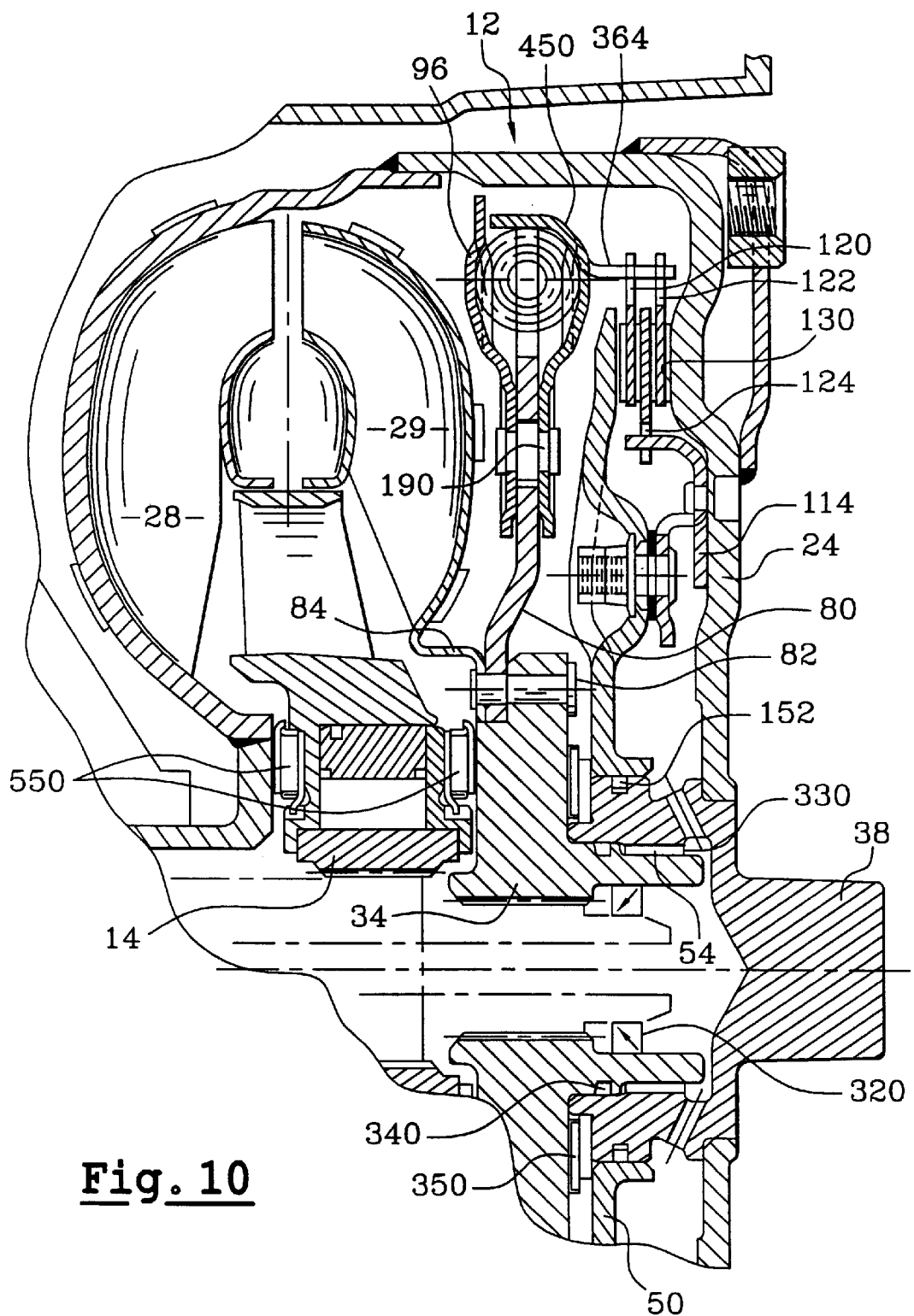

Naturally, in FIG. 10, the lugs 364 can be longer and drive the two discs like the ring 222 in FIG. 6.

Naturally, all the connections with cooperation of shapes between the discs 120 and 122 described in relation to the embodiment in FIGS. 1 to 5 are applicable to the embodiments in FIGS. 6 to 10. Thus, in FIG. 9, teeth can be provided with drive lugs angled twice as in FIG. 5, the lugs 364 meshing with the disc 120 radially below the connection between the discs 120, 121.

In FIGS. 1 to 5, it is possible to attach the supplementary pieces, advantageously thicker, to the input part 98 of the torsion damper 96 in order to effect the connection with the disc or discs 120, 122.

Naturally, the part 98 can be fixed to the turbine wheel.

In general terms, the attached piece, such as the ring, is fixed to an element, such as the washer 170, connected with respect to rotation to the turbine wheel.

The connections can be made by means of flutes. Any connection by cooperation of shapes can be envisaged. Naturally, the ring 222 can mesh with a first disc, the second disc coming into engagement with the first disc. A first one of the friction discs 120, 122 meshes with the second one of the friction discs over a circumference with a diameter less than that of the skirt 142 (FIGS. 2 and 5) or over a circumference with the same diameter as the set of teeth issuing from the skirt (FIG. 3). In FIGS. 8 and 9, a first disc 122 meshes with a second disc 120, over a circumference with a diameter greater than the skirt formed by the lugs 364. In FIGS. 4, 6 and 10, the skirt 142 directly drives the two discs 120, 122. As a variant, the two front 120 and rear 122 discs are connected with respect to rotation to the other one of the rear 122 and front 120 discs by axially elastic tongues.

It should be noted that, in FIGS. 8 and 9, the rear disc 122 is fixed with respect to rotation to the front disc 120 in the top part of the springs 95.

Figure 11:
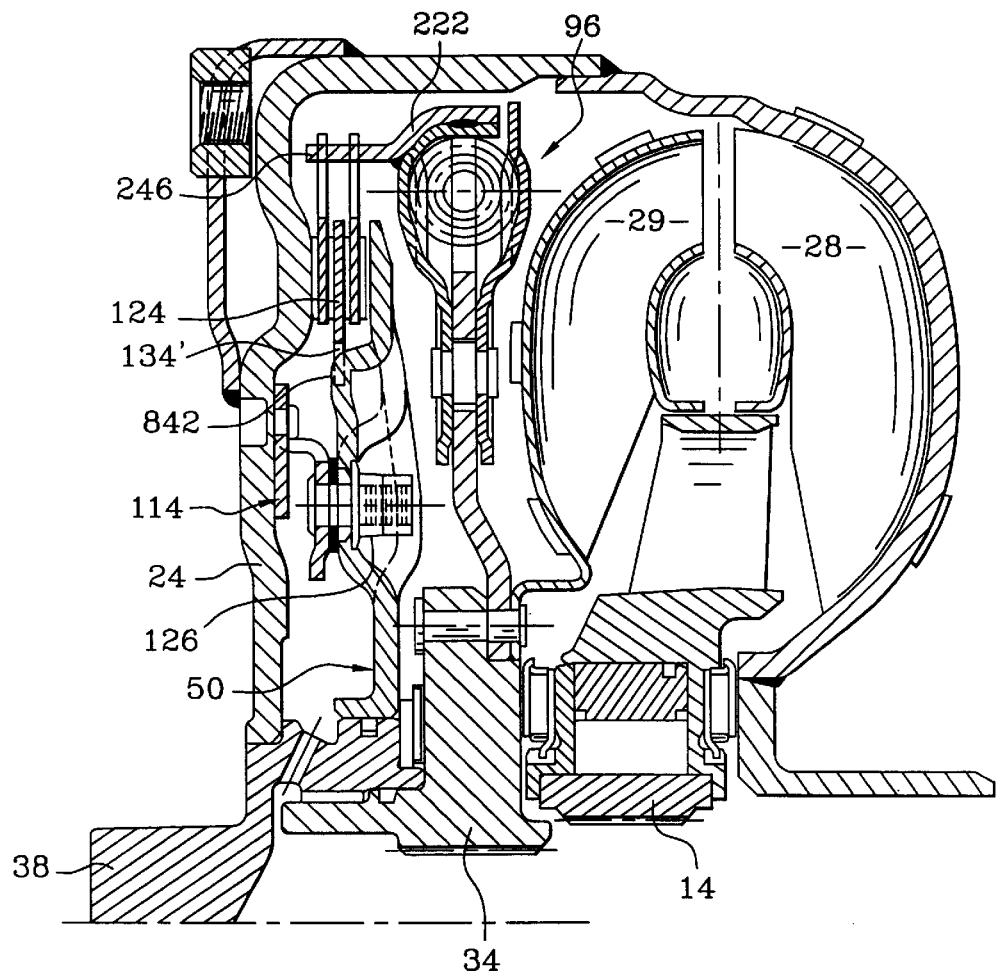
FIGS. 11, 12, 16, 17, 18, 22, 24, 26, 28, 30, are views similar to FIG. 1 for yet other example embodiments.

In a variant (FIG. 11) the piston 50 has a set of teeth 842 with a circumferential alternation of teeth and notches. The teeth in the set of teeth 842 enter with mounting clearance into the notches 134' in the disc 124. This arrangement makes it possible to omit the ferrule 138 of the drive piece and to simplify the latter.

The connection with respect to rotation by cooperation of shapes between the disc 124 and the piston 50 is effected above the drive piece.

Figure 12:
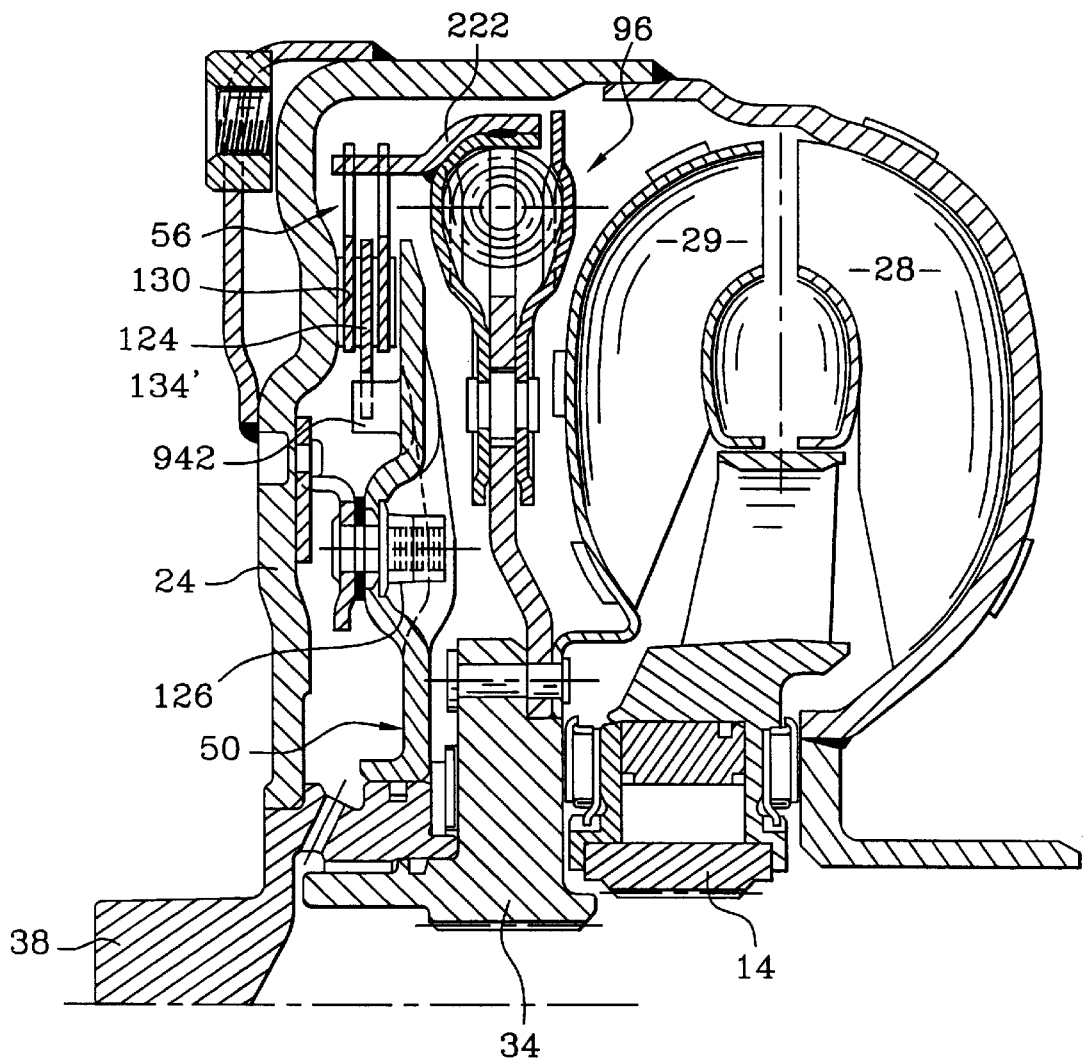
Figure 13:
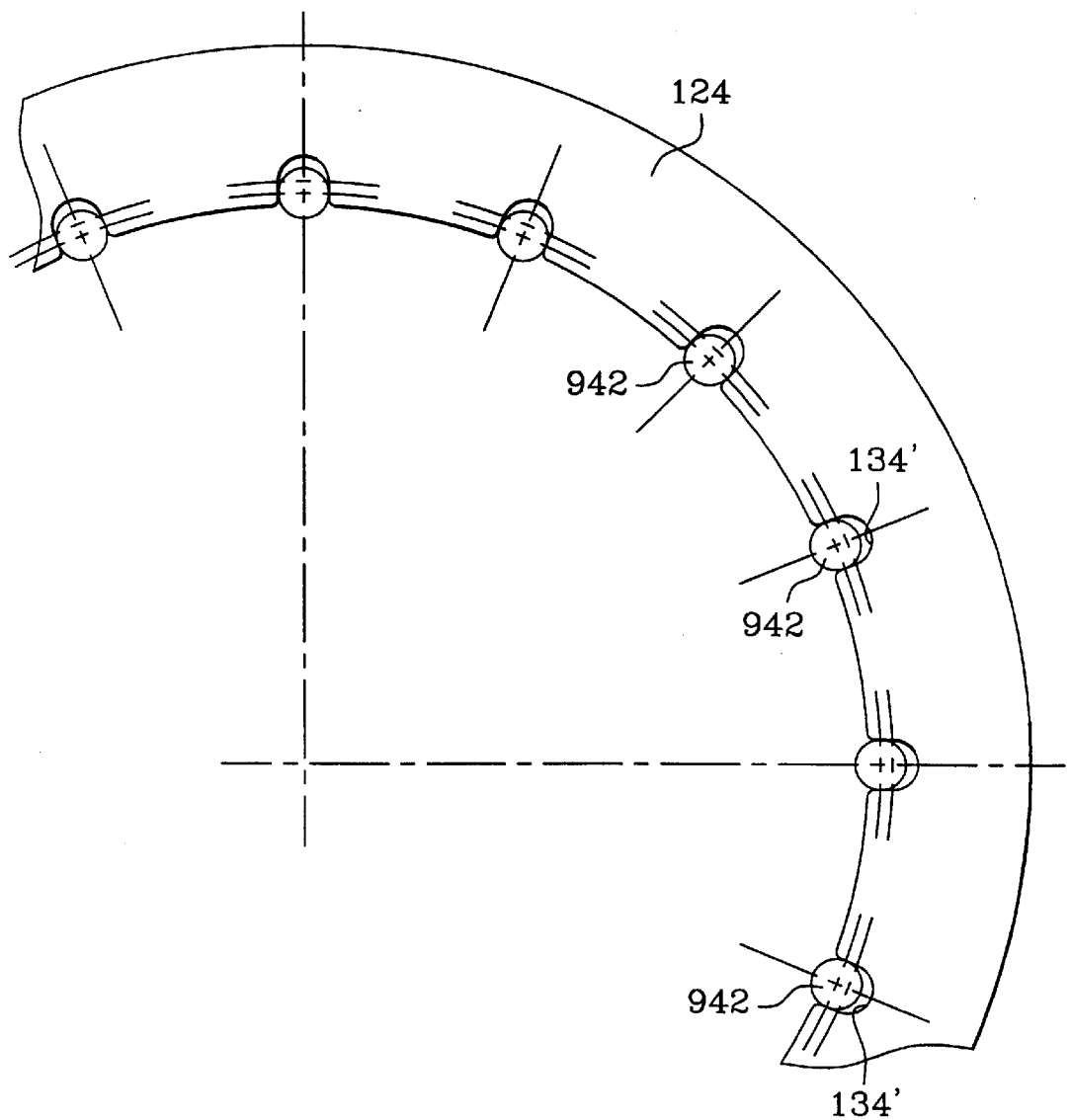
FIG. 13 is a partial view showing the disc and studs in FIG. 12.

The same applies in FIGS. 12 and 13. In this, studs 942, of axial orientation, are fixed by welding to the piston 50 radially above the drive washer 114.

Figure 14:
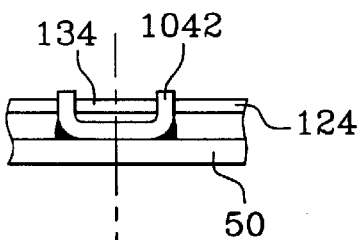
FIG. 14 is a partial view showing a U-shaped piece.
Figure 15:
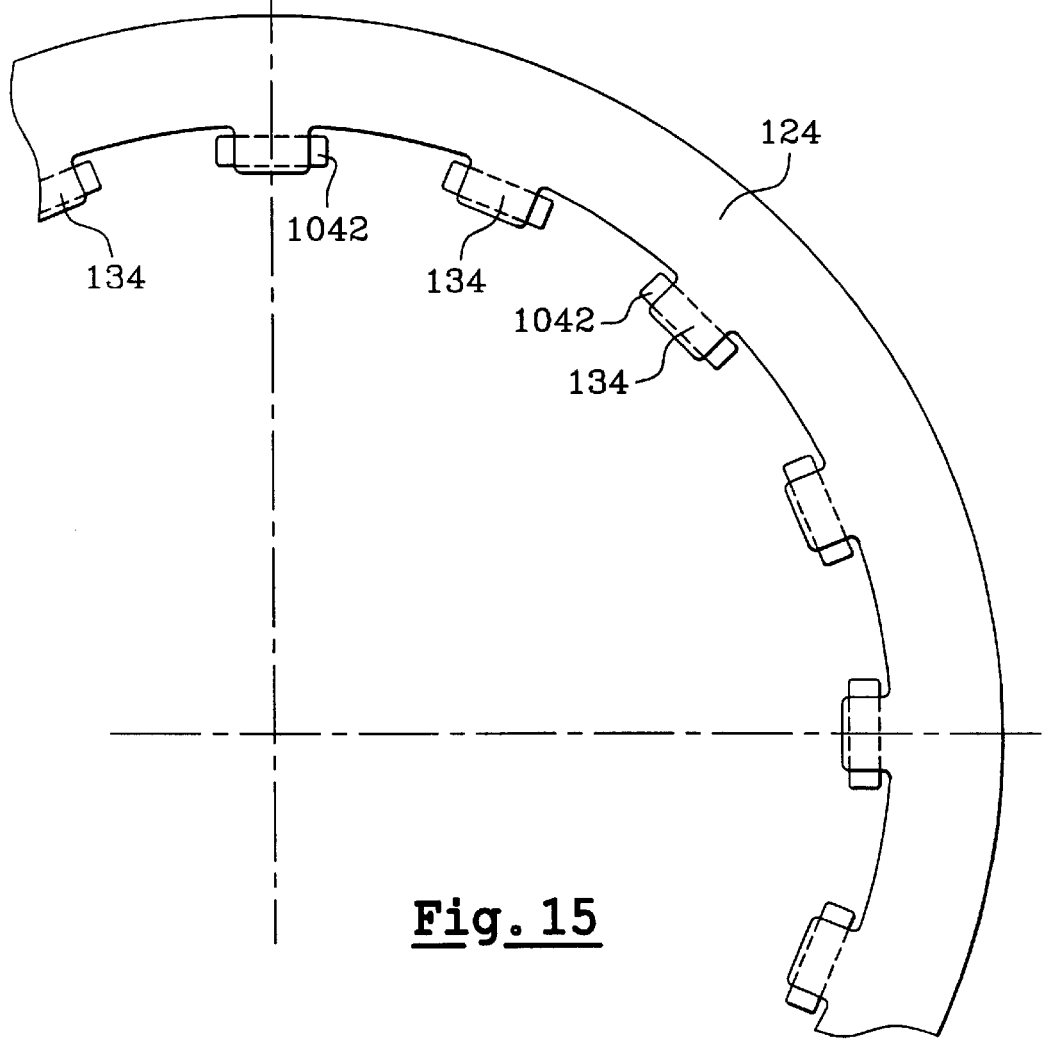
FIG. 15 is a view similar to FIG. 13 for another embodiment.

In a variant the studs 942 are replaced (FIGS. 14 and 15) by U-shaped pieces 1042 attached by welding to the piston 50. The lugs 134 on the disc 124 enter the pieces 1042 for meshing of the disc 124 with the piston 50.

Figure 16:
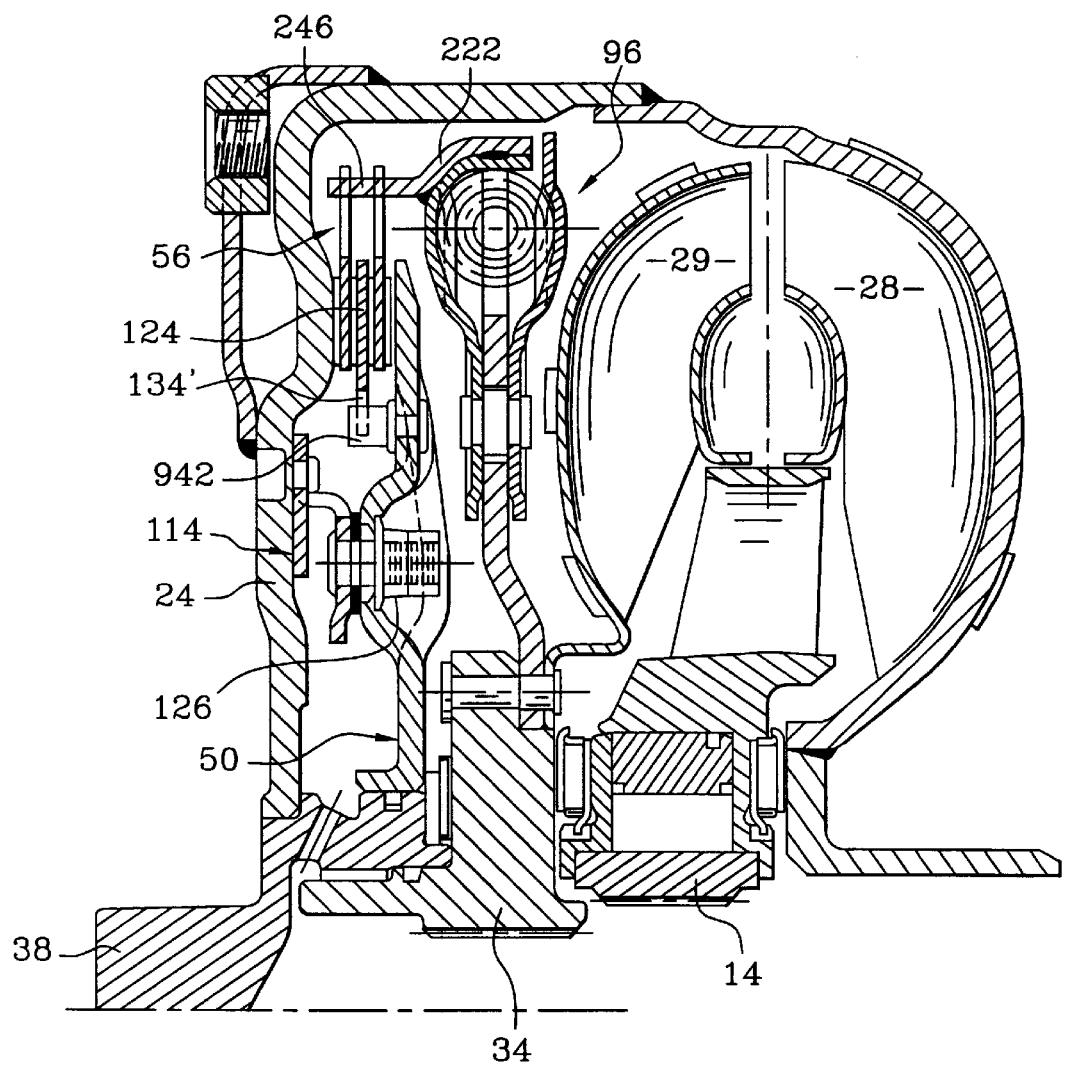

In a variant (FIG. 16) the studs 942 are fixed by riveting to the piston 50.

Thus in FIGS. 11 to 16 the piston 50 carries means for rotatably connecting the intermediate disc 124 with the piston, and this radially above the drive piece 114.

Naturally the studs can issue from a ring welded to the piston.

Figure 17:
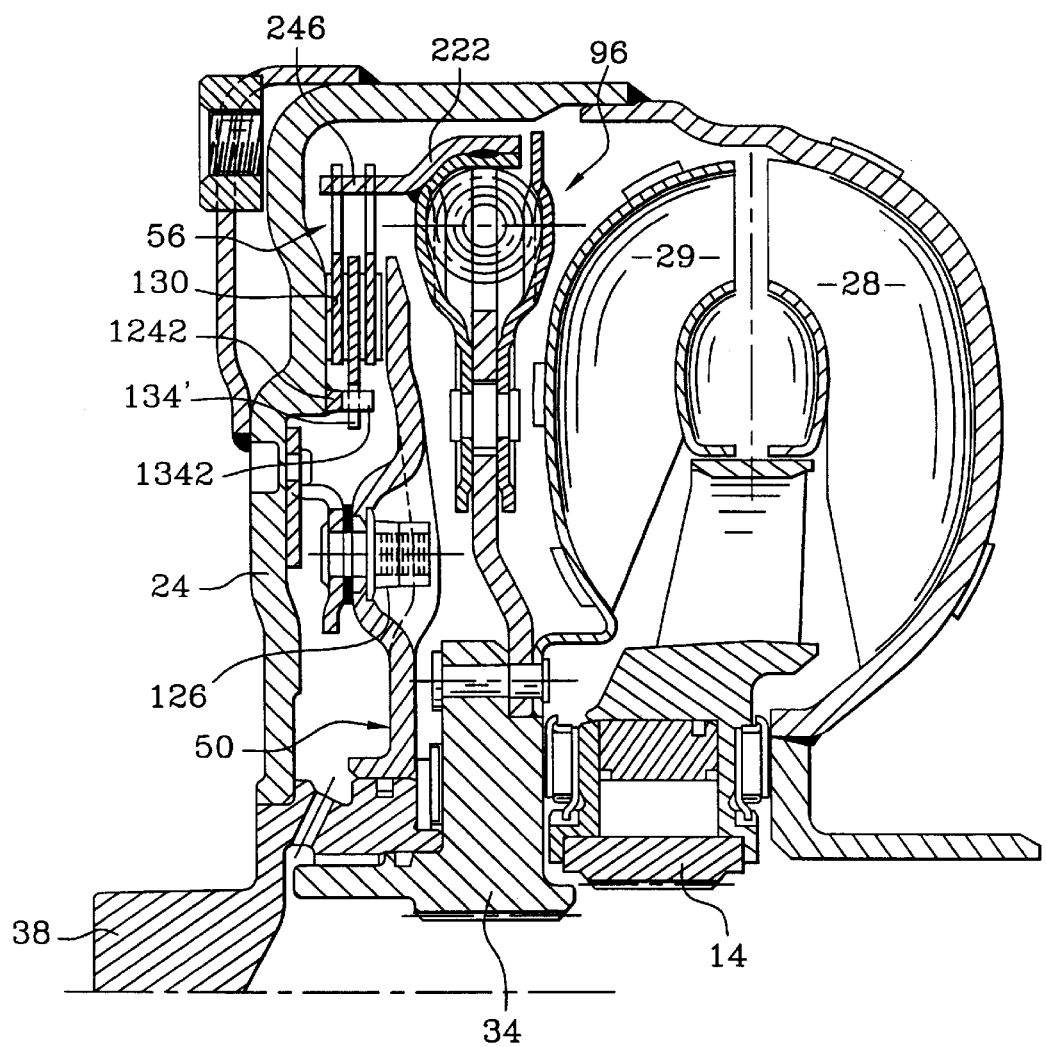

Naturally the means for rotatably connecting the disc 124 can be carried by the transverse wall. Thus the disc 124 is connected with respect to rotation either to the piston, or to the wall 24, and this between the area 130 and the drive washer 124. It will be appreciated that the connection with the wall 24 limits wear. Thus, in FIG. 17, the wall 24 carries a ring 1242 attached by welding to the wall 24 below the area 130. The ring 1242 carries studs 1342 passing through the notches 134' in the disc 124.

Figure 18:
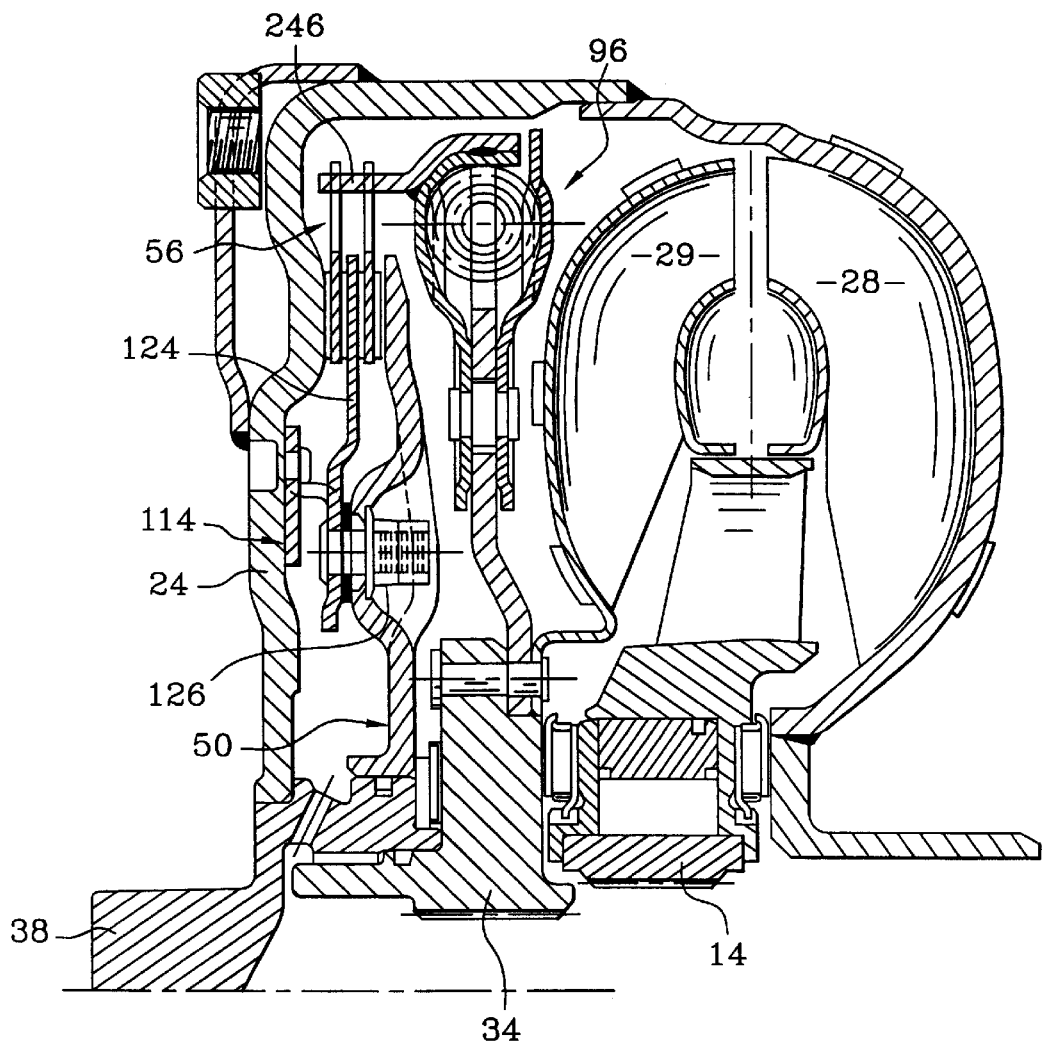
Figure 19:
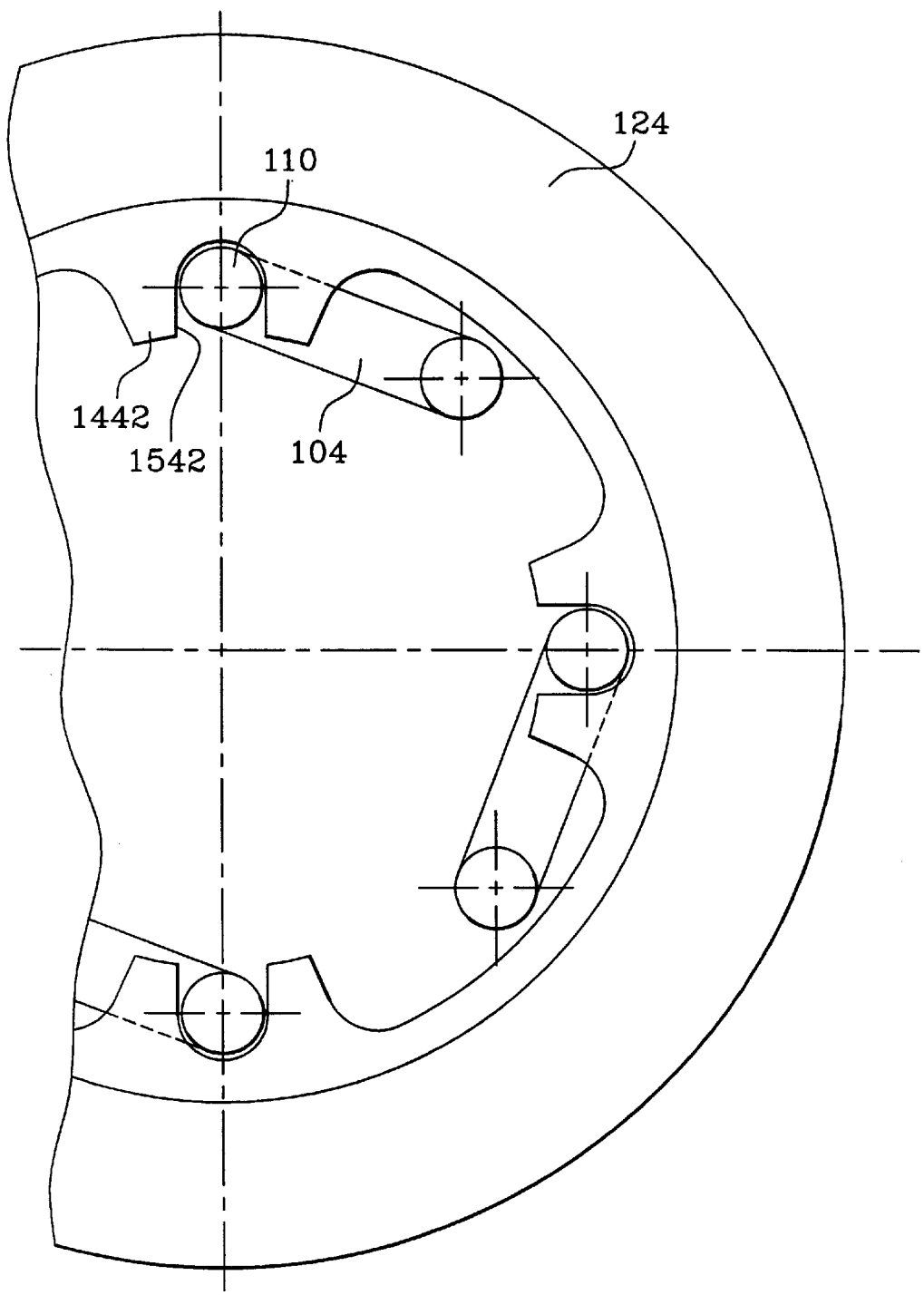
FIG. 19 is a partial view showing the intermediate disc and the tongues of FIG. 18.

The disc 124 can be extended at its internal periphery in order to mesh with the rivets 110 for fixing the tongues 104. Thus, in FIGS. 18 and 19, the disc 124 has at its internal periphery scalloped lugs 1442, the rivets 110 each entering the scallop 1542 in a lug 1442 for rotational connection of the disc 124 with the rivets 110 and therefore with the drive washer 114. The scallop 1542 is open towards the inside.

Figure 20:
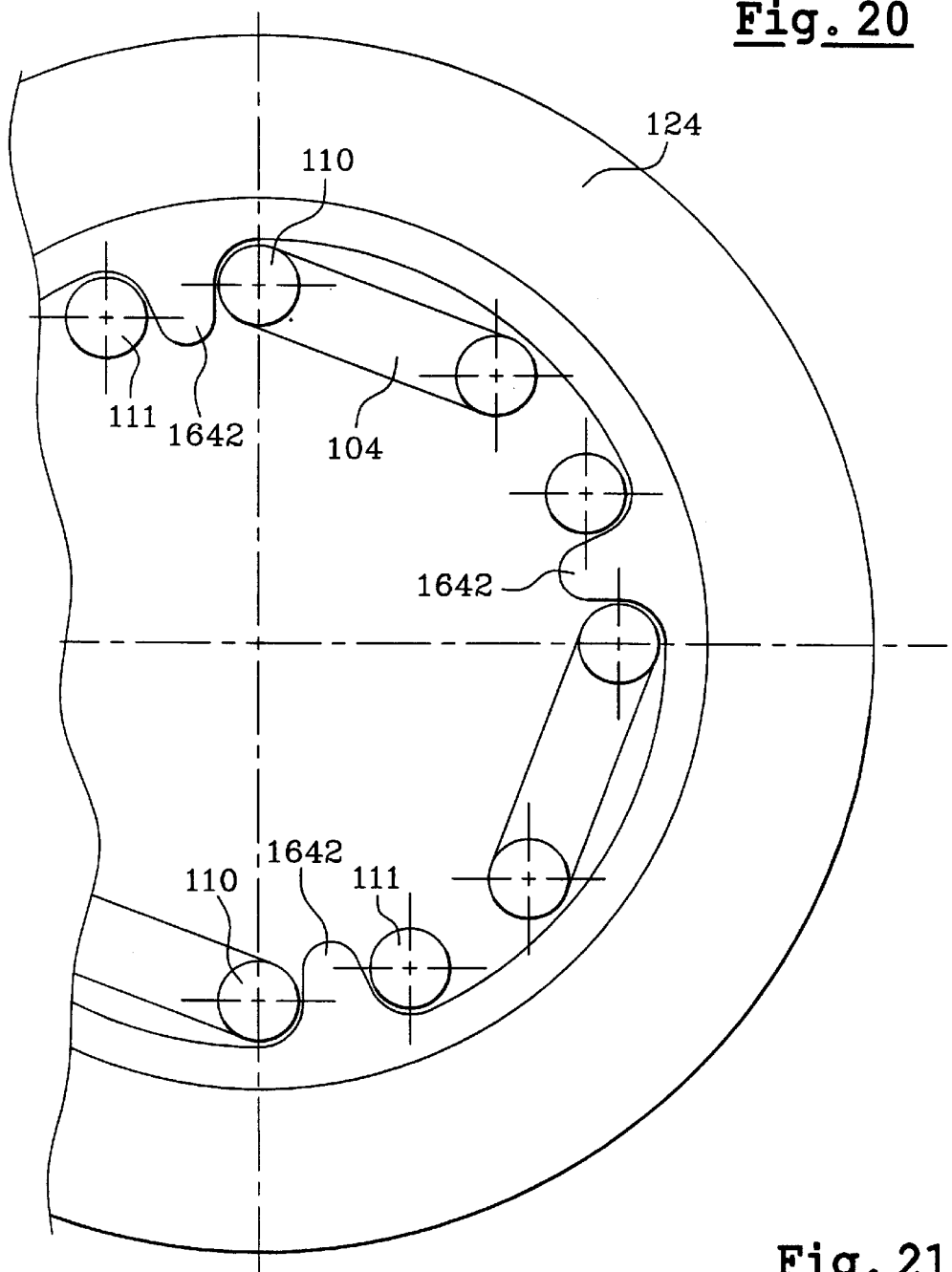
FIG. 20 is a view similar to FIG. 19 for another example embodiment.
Figure 21:
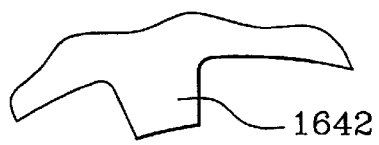
FIG. 21 is a partial view showing a variant projection.

In a variant the piece 114 carries supplementary rivets 111, FIG. 20. Thus pairs of rivets 110, 111 are formed. The disc 124 has at its internal periphery projections 1642 with rounded lateral edges. Each projection 1642 enters between two rivets 110, 111 in a pair for rotational connection of the disc 124 with the rivets 110, 111 and the drive washer 114. In a variant (FIG. 21) the projection 1642 is trapezoidal in shape.

Figure 22:
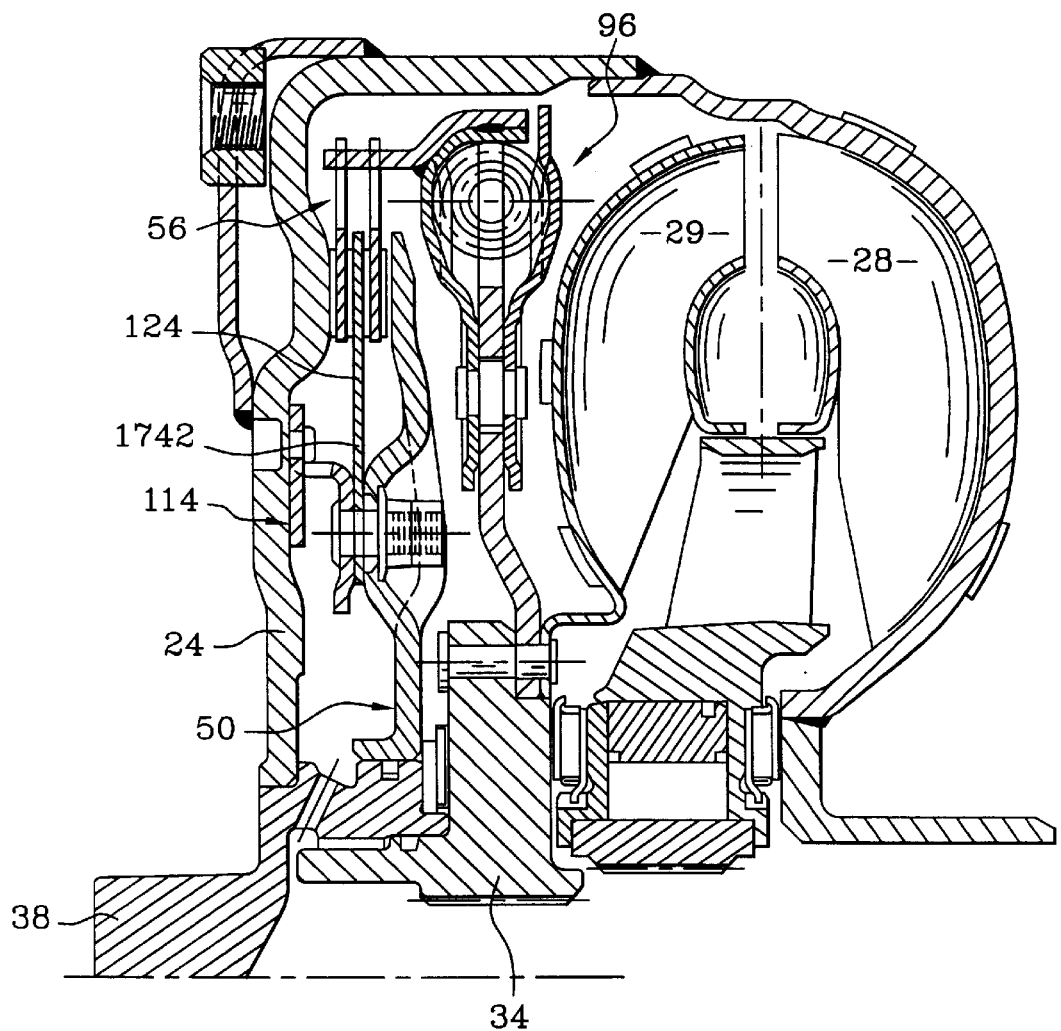
Figure 23:
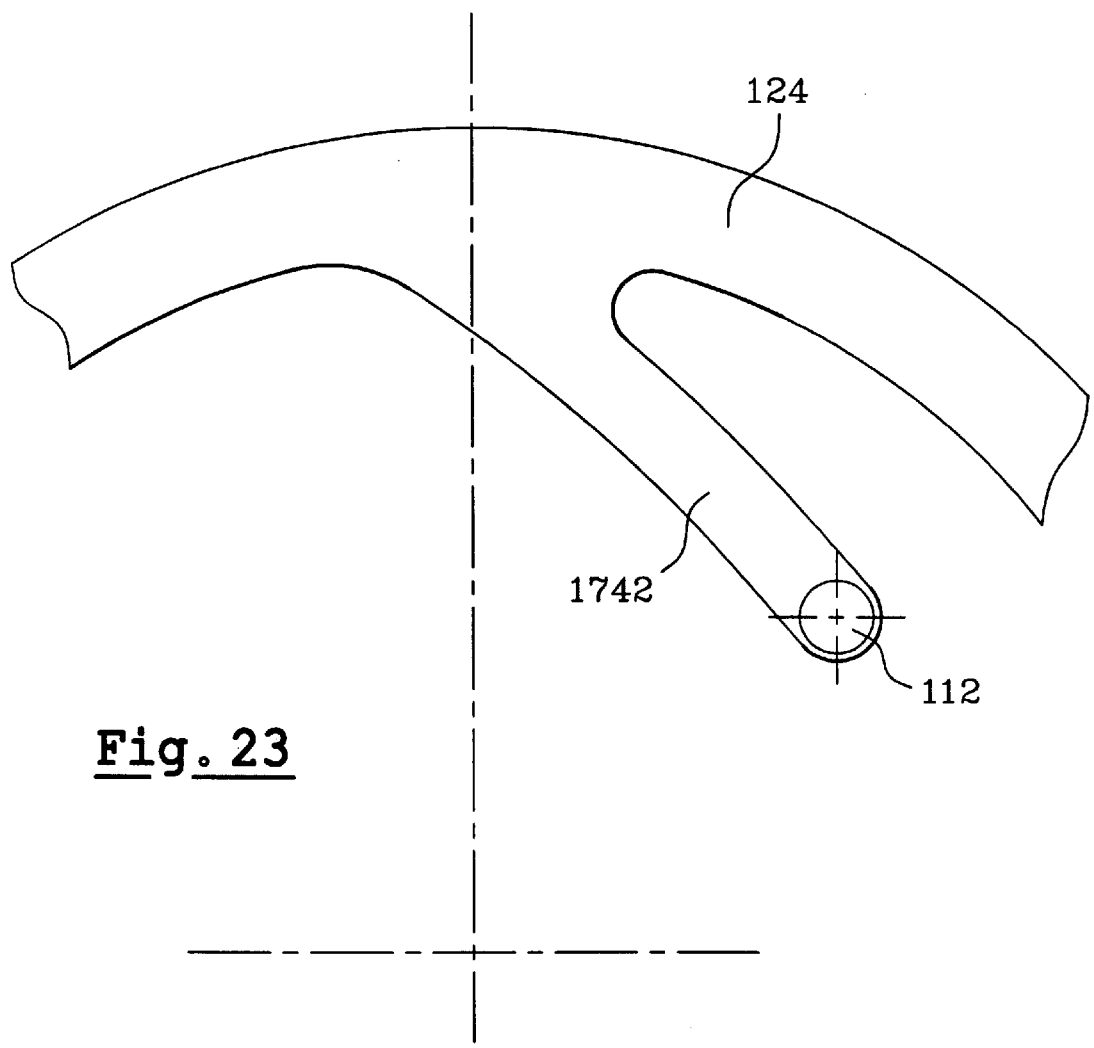
FIGS. 23, 25, 27, 29, 31 are partial views showing the intermediate disc and the second tongue of FIGS. 22, 24, 26, 28, 30.

Naturally the intermediate disc 124 can have at its internal periphery a plurality of tongues 1742 distributed circumferentially in a regular manner (FIGS. 22 and 23). The tongues 1742 are axially elastically deformable and are here inclined whilst extending at the internal periphery of the disc 124. Rivets 112 fix the free ends of the tongues 1742, constituting the aforementioned second tongues, to the drive washer.

In the previous figures the disc 124 was rotatably connected to one of the elements piston 50—transverse wall 24—drive washer 114 by cooperation of shapes. In FIGS. 22 and 23 as in the other figures this connection is effected by second axially elastic tongues acting between the disc 124 and one of the aforementioned elements 50, 24, 114. This connection reduces friction and therefore wear. It reduces the risks of jamming and allows rapid movement of the disc 124.

In FIGS. 18 to 23 the rotational connection of the disc 124 is effected at a distance from the transverse wall 24.

Figure 24:
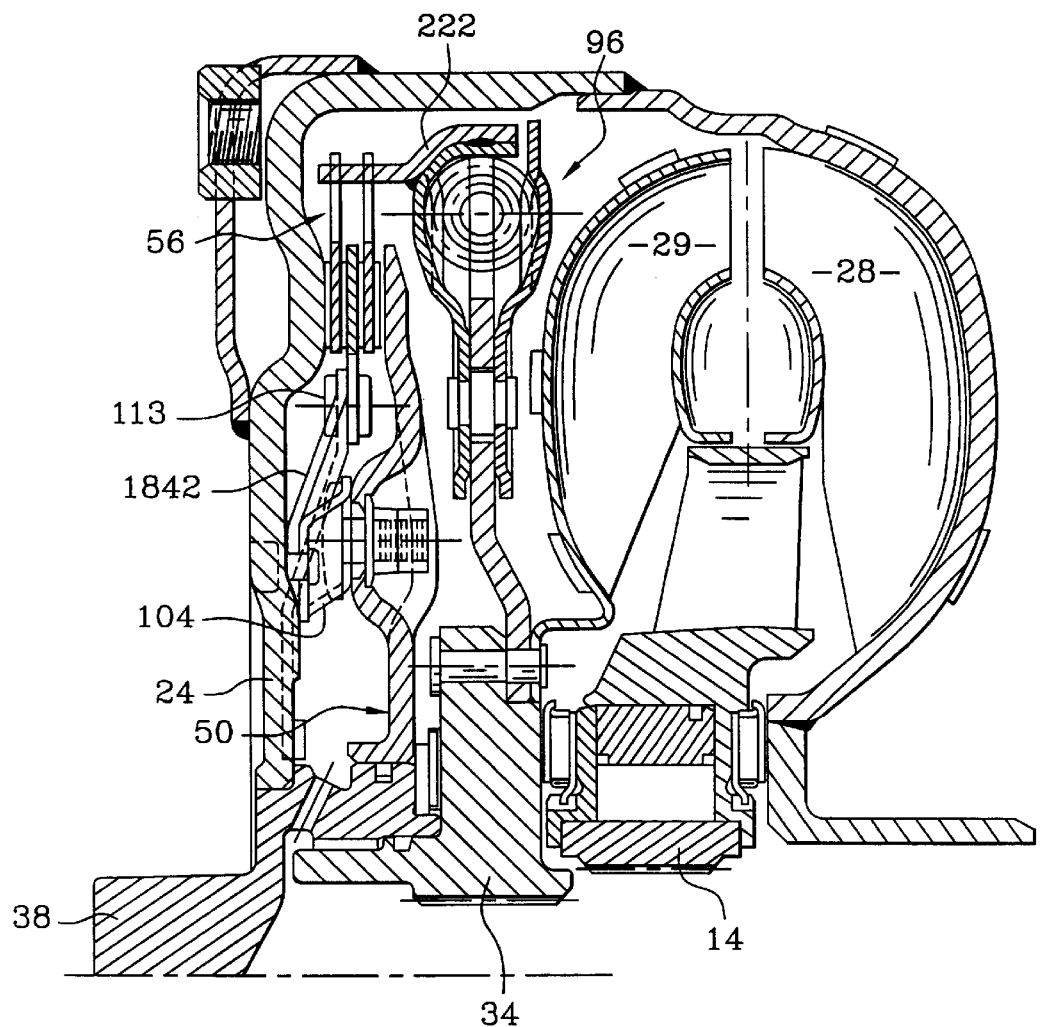
Figure 25:
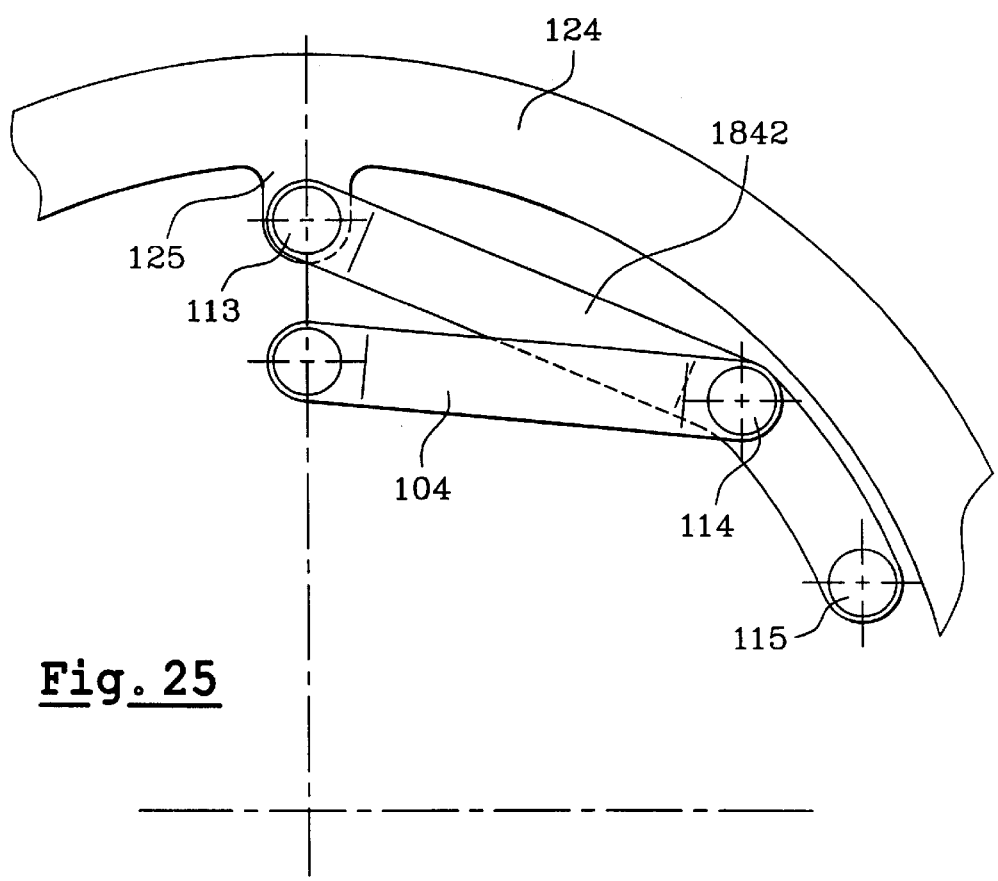

In FIGS. 24 and 25 this connection acts between the disc 124 and the wall 24. This connection is effected by means of second elastically deformable tongues advantageously distributed in a regular manner.

In these figures the number of second tongues is equal to that of the tongues 104 referred to as the first tongues.

The second tongues 1842 are fixed by riveting at 113 at one of their ends to brackets 125 which the disc 124 has at its internal periphery. At their other end the tongues 1842 are fixed by rivets 115 to the wall 24.

The first tongues 104 are fixed between the rivets 113, 115 to the second tongues 1842 by rivets 114. The second tongues 1842 are inclined between the rivets 113 and 114 and have a curved shape between the rivets 114 and 115.

Figure 26:
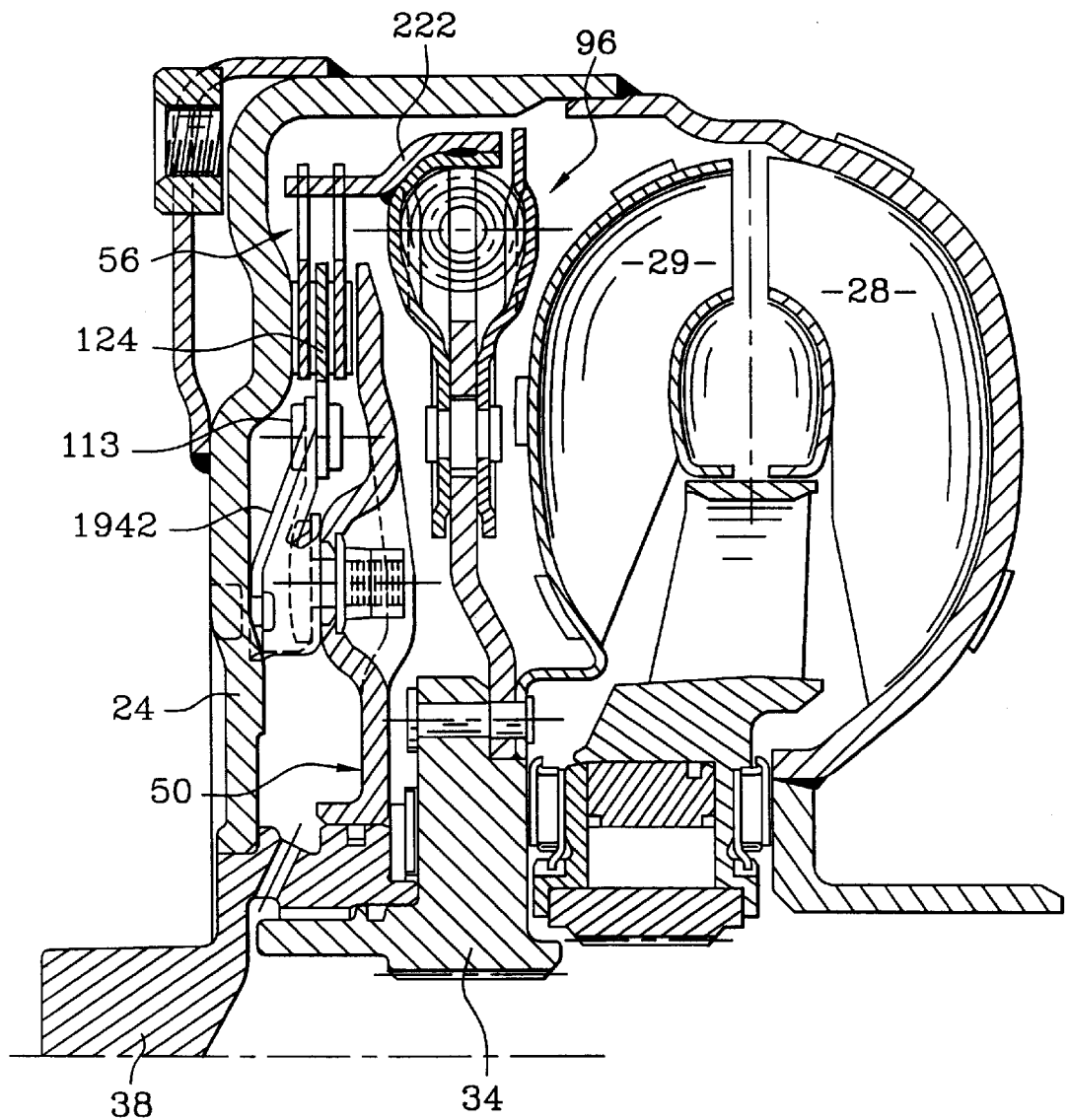
Figure 27:
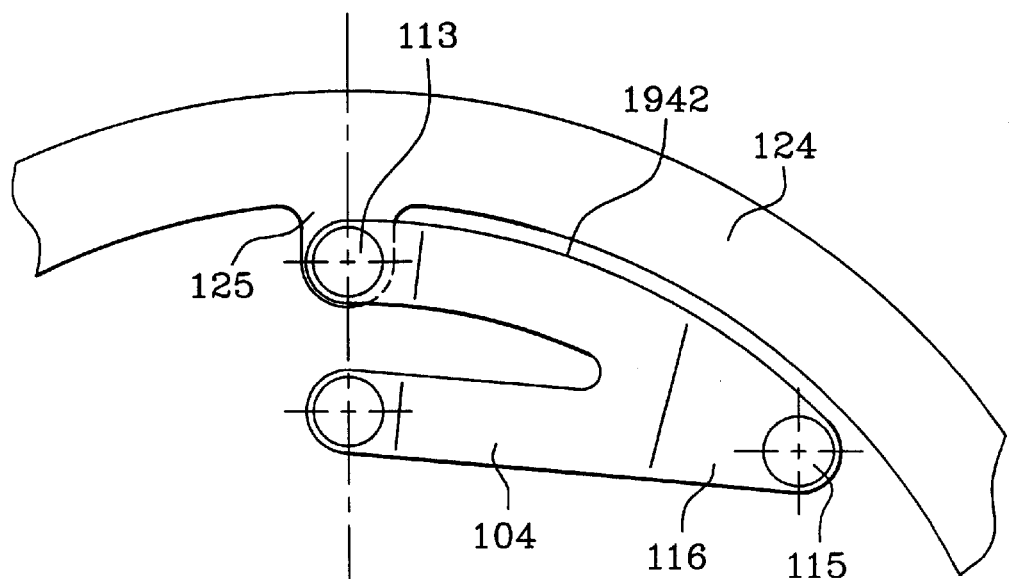

In FIGS. 26 and 27 the first tongues 104 are in a single piece with the second tongues 1942 and form the internal branch thereof. These second tongues 1942 have roughly the shape of an inverted C with a top leg of curved shape extends at a short distance with respect to the internal periphery of the disc 124. The internal leg 104 is rectilinear. The two legs issue from an area 116 offset axially in order to be fixed by means of rivets 115 to the wall 24.

Figure 28:
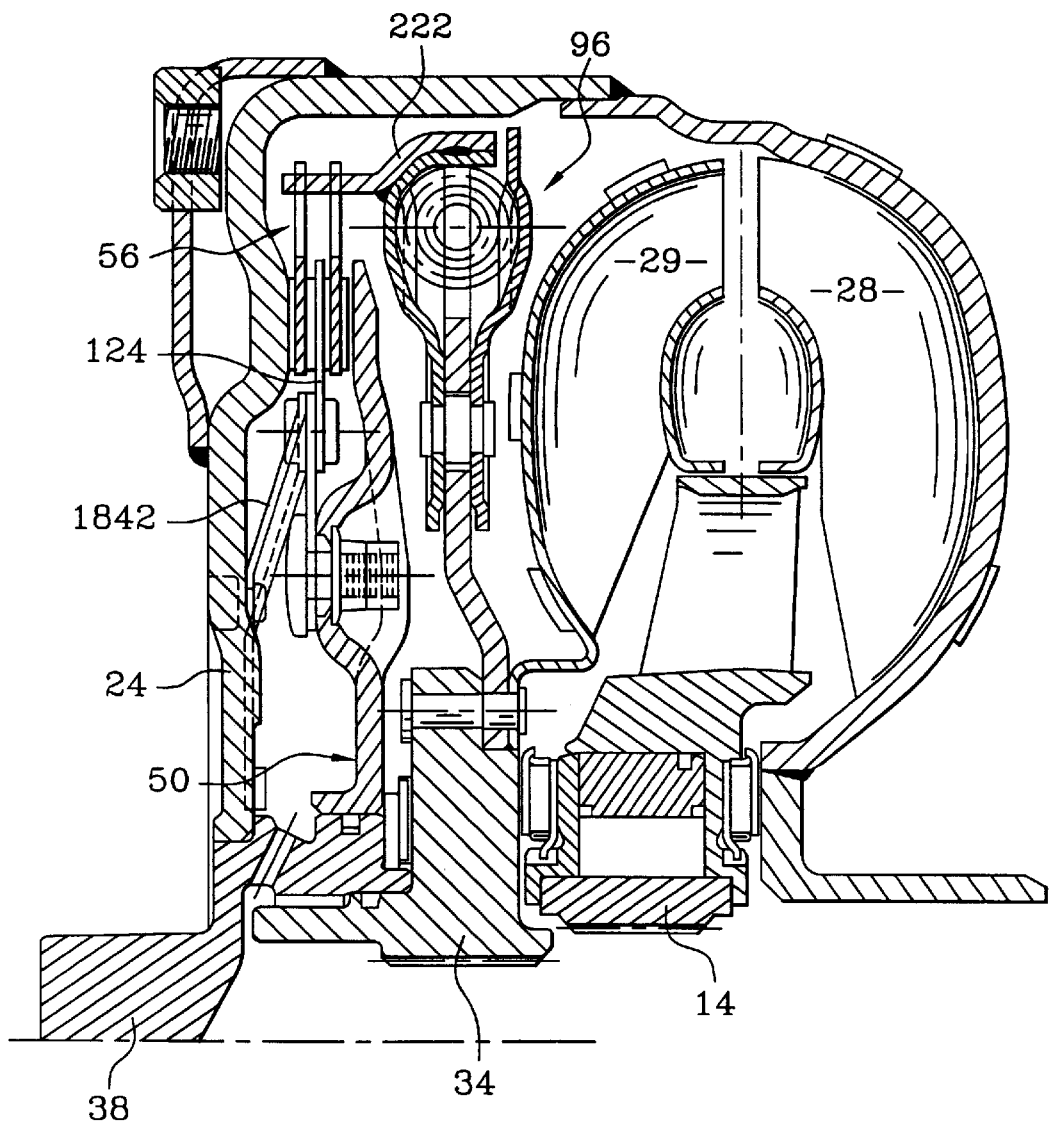
Figure 29:
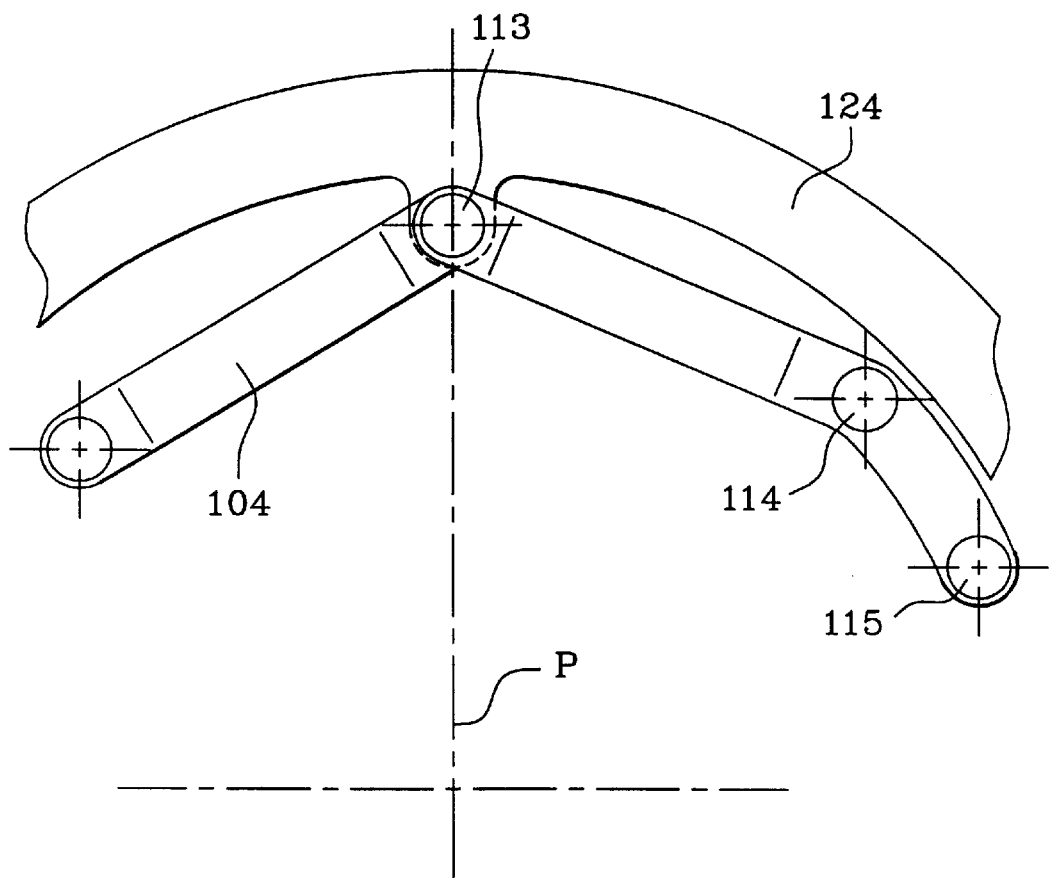

In FIGS. 28 and 29 the second tongues have the same shape as that of the tongues 1842, and the first tongues are fixed to the brackets 125 whilst extending on the other side of the plane P with respect to the second tongues 1842, whilst in FIGS. 24 to 27 the second tongues and the first tongues extend on the same side of the plane P.

In these FIGS. 24 to 29 the washer 114 has been omitted.

Figure 30:
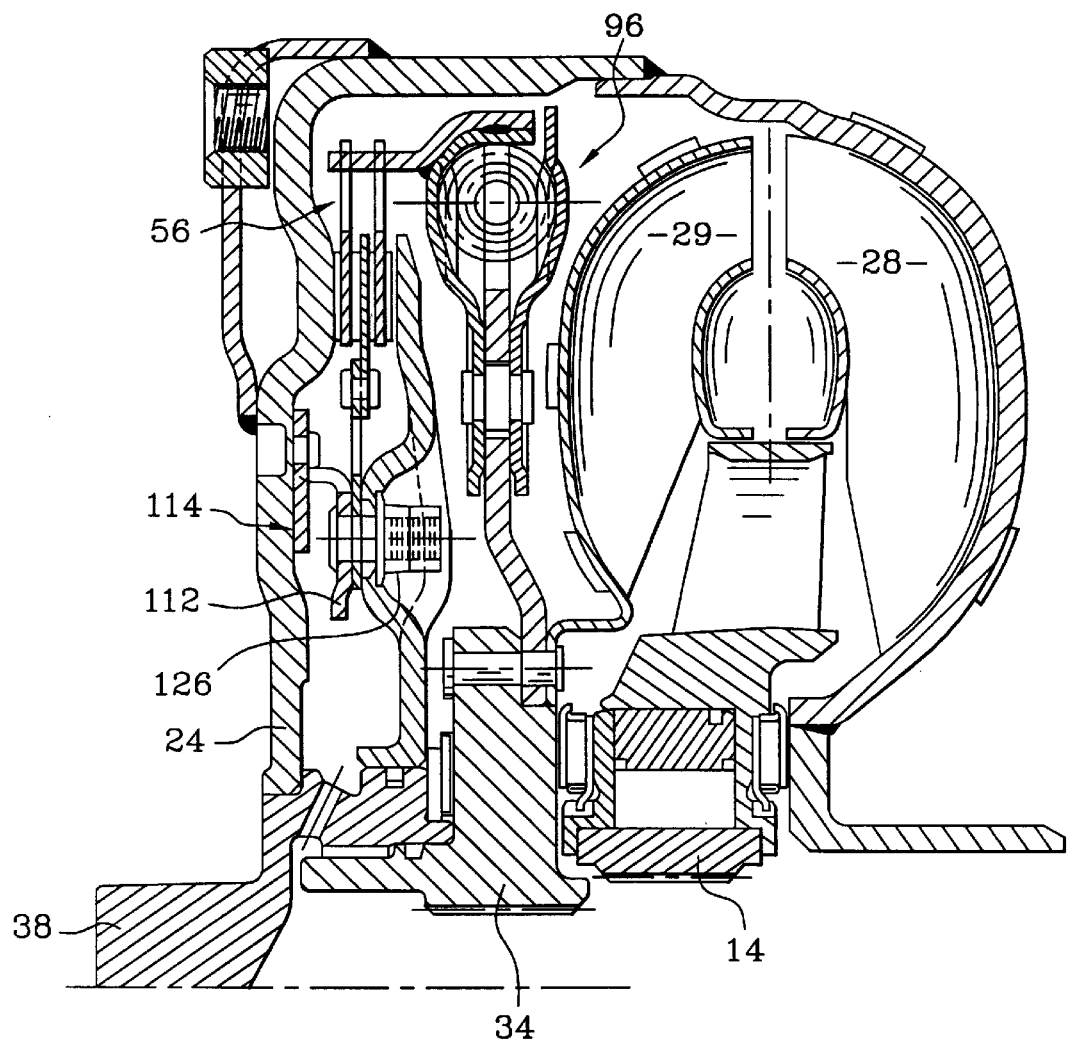
Figure 31:
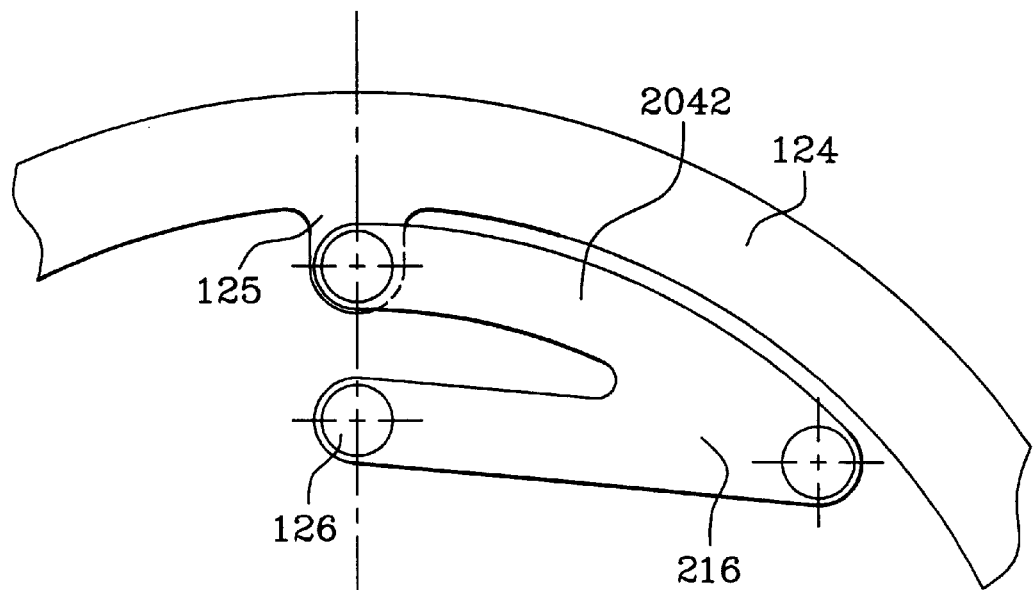

In FIGS. 30 and 31 the drive washer 114 is present. The second tongues 2042 have a shape identical to that of the tongues 1942, the only difference lying in the embedding area 216, which is in the same plane.

This area 216 is gripped between the brackets 112 of the washer 114 and the piston 50. It is the fixing members in two parts 126 which fix these second tongues. Such members are also visible in FIGS. 6 to 29 and are in two parts, as described in the document FR-A-2726620, to which reference should be made for more information.

What is claimed is:

1. Hydrokinetic coupling apparatus (10), comprising:
    a casing (12) provided with a wall (24), of transverse orientation overall, able to be connected with respect to rotation to a driving shaft;
    a turbine wheel (30) fixed with respect to rotation to a hub (34) able to be connected with respect to rotation to a driven shaft;
    a lock-up clutch (16), acting between the turbine wheel (30) and the transverse wall (24), which has, arranged axially from front to rear between the turbine wheel (30) and the transverse wall (24);
    a piston (50) in the form of an annulus, of transverse orientation overall, movable axially and connected with respect to rotation to the casing (12);
    and a set (56) of flat annular parallel friction discs (120, 124, 122) of roughly transverse orientation, which is adapted to be clamped axially by the piston (50) between a piston face (128) and an opposite internal face (130) of the transverse wall (24) of the casing (12) and which has on the one hand two radially external front (120) and rear (122) discs which are connected with respect to rotation to the turbine wheel (30) and on the other hand a radially internal intermediate disc (124) which is disposed axially between the front (120) and rear (122) discs and which is connected with respect to rotation to the two elements consisting of the piston (50) and the transverse wall (24) of the casing (12), annular friction linings (126) being interposed between the friction discs (120, 122, 124), the piston (50) and the internal face of the transverse wall (24);
    wherein the piston (50) and the transverse wall (24) of the casing (12) define two element that are connected with respect to rotation by tongues (104) substantially elongated tangentially to a circumference of the assembly and the opposite ends of tongues (104) are coupled to the two elements, and wherein the intermediate friction disc (124) is drivingly connected to at least one member coupling the ends of the tongues (104) to one of the two elements (50–24).

2. Apparatus (10) according to claim 1, characterized in that the tongues (104) are coupled by their first ends (108) to a first (12) one of the two elements (12, 50) which the tongues (104) connect with respect to rotation, by means of a drive washer (114) common to all the tongues (104) and which is coupled to the first element (12, 24), and in that the intermediate friction disc (124) is driven in rotation by the common drive washer (114).

3. Apparatus (10) according to claim 2, characterized in that the external radial periphery of the common drive washer (114) has a ferrule (138) of roughly axial orientation having at least one notch (136) through which there extends, radially inwards, a drive lug (134) belonging to the intermediate friction disc (124).

4. Apparatus (10) according to claim 3, characterized in that the ferrule (138) of the common drive washer (114) has a series of notches (136) distributed angularly in a regular manner, through each of which there extends, radially inwards, a corresponding drive lug (134) in a series of lugs belonging to the intermediate friction disc (124).

5. Apparatus (10) according to claim 3, characterized in that each notch (136) is open axially in the axial end edge (140) of the ferrule (138) of the common drive washer (114).

6. Apparatus (10) according to claim 2, characterized in that a drive lug (134) is received with circumferential clearance in a corresponding notch (136) in a ferrule (138) of the common drive washer (114).

7. Apparatus (10) according to claim 3, characterized in that each drive lug (134) of the intermediate friction disc (124) lies in the plane of the disc.

8. Apparatus (10) according to claim 3, characterized in that the ferrule (138) of the common drive washer (114) is an axially oriented cylindrical ferrule.

9. Apparatus (10) according to claim 3, characterized in that the ferrule (138) of the common drive washer (114) is a frustoconical ferrule.

10. Apparatus (10) according to claim 2, characterized in that the common drive washer (114) is coupled to the first element (12, 24) by one of gluing welding and riveting.

11. Apparatus (10) according to claim 2, characterized in that the common drive washer (114) is coupled to the transverse wall (24) of the casing (12).

12. Apparatus (10) according to claim 2, characterized in that the common drive washer (114) carries at its external periphery second elastic drive tongues fixed at their other end to the intermediate friction disc (124) for driving the latter in rotation.

13. Apparatus according to claim 2, characterized in that the tongues are extended radially at one of their ends in order to drive the intermediate friction disc in rotation by means of a connection with notches and lugs.

14. Apparatus (10) according to claim 1, characterized in that the front (120) and rear (122) friction discs each have at least one drive lug (148, 160) which extends radially outwards in order to be received in a corresponding notch (146) in an axially oriented cylindrical annular skirt (142, 242) connected with respect to rotation to the turbine wheel (30).

15. Apparatus (10) according to claim 14, characterized in that the skirt (242) belongs to a piece attached to an element fixed with respect to rotation to the turbine wheel (30).

16. Apparatus (10) according to claim 15, characterized in that the front (120) and rear (122) friction discs each have a series of drive lugs (148, 160) distributed angularly in a regular manner in order to be received in corresponding notches (146, 246) in an axially oriented cylindrical annular skirt (142, 242) fixed with respect to rotation to the turbine wheel (30).

17. Apparatus (10) according to claim 14, characterized in that said corresponding notch (146, 246) is open axially.

18. Apparatus (10) according to claim 12, characterized in that each said at least one drive lug (148, 160) lies in the plane of its friction disc (120, 122).

19. Apparatus (10) according to claim 10, characterized in that one of the front (120) or rear (122) friction discs has at least one drive lug (148) which extends radially towards the outside in order to be received in a notch (146) in an axially oriented cylindrical annular skirt (142) fixed with respect to rotation to the turbine wheel (30), and in that the other one (122) of the rear or front friction discs has at least one drive lug (160) which cooperates with a lug (146) for driving said one disc (120) in order to mesh with said disc.

20. Apparatus (10) according to claim 19, characterized in that the drive lug (160) for said other disc (122) extends radially outwards and then axially in the direction of the other disc (120).

21. Apparatus (10) according to claim 20, characterized in that the drive lug (160) for said other disc (122) is angled at 90°, and in that the drive lug (146) for said disc (120) extends in the plane of this disc.

22. Apparatus (10) according to claim 20, characterized in that the drive lug (145, 160) of the front (120) and rear (122) friction discs are angled twice so that their free end portions, radially external and of transverse orientation, are substantially coplanar.

23. Apparatus (10) according to claim 2, characterized in that one (122) of the front or rear friction discs has at least one drive lug (160) angled at 90° which extends radially outwards and then axially in the direction of the other disc (120) opposite a drive lug (146) which extends radially outwards from the periphery of the other one (120) of the rear or front friction discs and whose free end (162) extends radially in a notch (146) formed in an annular cylindrical skirt (142), of roughly axial orientation, connected with respect to rotation to the turbine wheel (30).

24. Apparatus (10) according to claim 9, characterized in that the front friction disc (122) which is closest to the turbine wheel meshes with a guide washer (170) fixed with respect to rotation to the turbine wheel (30) on a circumference with a diameter less than the circumference according to which the rear disc meshes with a connection with cooperation of shapes with the front disc.

25. Apparatus (10) according to claim 14, characterized in that the lock-up clutch (16) has a torsion damper interposed between the turbine wheel (30) and the piston (50), and in that said skirt (142, 242) belongs to an input part (98) of the torsion damper (96).

* * * * *